US008970757B2

(12) United States Patent
Kobayashi

(10) Patent No.: US 8,970,757 B2
(45) Date of Patent: Mar. 3, 2015

(54) SOLID-STATE IMAGE PICKUP ELEMENT, DRIVING METHOD THEREOF, AND CONTROL PROGRAM

(75) Inventor: Hirokazu Kobayashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 13/605,392

(22) Filed: Sep. 6, 2012

(65) Prior Publication Data

US 2013/0063635 A1    Mar. 14, 2013

(30) Foreign Application Priority Data

Sep. 13, 2011    (JP) ................................. 2011-199711

(51) Int. Cl.
| H04N 5/335 | (2011.01) |
| H04N 5/217 | (2011.01) |
| H01L 27/00 | (2006.01) |
| H03M 1/00 | (2006.01) |
| H04N 5/374 | (2011.01) |
| H04N 5/3745 | (2011.01) |
| H04N 5/378 | (2011.01) |

(52) U.S. Cl.
CPC ......... *H04N 5/3742* (2013.01); *H04N 5/37457* (2013.01); *H04N 5/378* (2013.01)
USPC ........ 348/308; 348/294; 348/241; 250/208.1; 250/214 R; 341/122

(58) Field of Classification Search
CPC ..... H04N 5/335; H04N 5/217; H04N 5/3575; H01L 27/00; H03M 1/00
USPC ........... 348/308, 294, 241; 250/208.1, 214 R; 341/122
See application file for complete search history.

(56) References Cited

U.S. PATENT DOCUMENTS

| 7,154,075 | B2 * | 12/2006 | Krymski ................... 250/208.1 |
| 7,286,170 | B2 * | 10/2007 | Inui et al. ...................... 348/241 |
| 7,456,886 | B2 | 11/2008 | Shinohara ..................... 348/308 |
| 7,990,440 | B2 * | 8/2011 | Kobayashi et al. ........... 348/241 |
| 2004/0080645 | A1 | 4/2004 | Shinohara ..................... 348/301 |
| 2007/0045514 | A1 * | 3/2007 | McKee et al. .............. 250/208.1 |
| 2009/0207293 | A1 * | 8/2009 | Ryoki et al. .................. 348/308 |
| 2010/0238330 | A1 * | 9/2010 | Hirota ........................... 348/273 |
| 2011/0278438 | A1 | 11/2011 | Kobayashi ................... 250/214 |
| 2012/0175503 | A1 | 7/2012 | Kuroda et al. ................ 250/214 |
| 2012/0193690 | A1 | 8/2012 | Inoue et al. .................. 257/290 |
| 2012/0273657 | A1 | 11/2012 | Kobayashi ................. 250/208.1 |

FOREIGN PATENT DOCUMENTS

| JP | 2004-134867 A | 4/2004 |
| JP | 2010-206653 A | 9/2010 |

* cited by examiner

*Primary Examiner* — Tuan Ho
*Assistant Examiner* — Marly Camargo
(74) *Attorney, Agent, or Firm* — Fitzpatrick, Cella, Harper & Scinto

(57) ABSTRACT

A solid-state image pickup element comprises a plurality of first signal storage units connected to each vertical output line to store a signal transferred from a selected unit cell to each vertical output line, and a plurality of second signal storage units connected to each vertical output line to store the signals transferred from a first number of first signal storage units, wherein the plurality of first signal storage units and the plurality of second signal storage units are selectively driven such that in a period of time for selectively driving the first signal storage unit to store the signal transferred to the vertical output line by driving a signal read-out unit of the selected unit cell, another first signal storage unit connected to the vertical output line and the second signal storage unit to store the signal transferred from the another first signal storage unit are selectively driven.

11 Claims, 12 Drawing Sheets

SOLID-STATE IMAGE PICKUP ELEMENT, DRIVING METHOD THEREOF, AND CONTROL PROGRAM

BACKGROUND OF THE INVENTION

1. Field of the Invention

The present invention relates to a solid-state image pickup element, its driving method thereof, and a control program and, more particularly, to a CMOS solid-state image pickup element, its driving method thereof, and a control program.

2. Description of the Related Art

Recently, an image pickup element is being advanced in such a manner that it has the large number of pixels, while this advance rises a problem that higher read-out time is required.

Multi-channelization can be mentioned as one of well-known techniques for high-speed read-out of the image pickup element. The multi-channelization is such a technique that a plurality of output terminals are provided so that groups of vertical output lines output signals in parallel to the different output terminals, respectively, for example, thereby enabling the high-speed read-out to be performed.

However, such multi-channelization does nothing but shorten a time required for horizontal transfer in a driving method of the image pickup element. Therefore, such a time is hardly shortened with respect to the operations during so-called a horizontal blanking period, which need to be executed before the horizontal transfer. Such operations are such that, for example, a signal electric charge is transferred from a photoelectric conversion element to a floating diffusion layer portion, signal potentials appearing on the vertical output lines are transferred to capacitors serving as signal storage units arranged on the column basis, and the like.

On the other hand, a technique for the high-speed read-out which is attained by simultaneously performing a part of the operation to be performed during the horizontal blanking period and the horizontal transfer is also known besides the multi-channelization.

According to the Official Gazette of Japanese Laid-Open Patent Application No. 2010-206653 (Patent Literature 1), a construction and a driving method of an image pickup element which can realize such a technique are disclosed. That is, there is disclosed an image pickup element "comprising: a plurality of pixels arranged two-dimensionally; a plurality of vertical output lines to which a plurality of pixels arranged every other predetermined rows in each column of the plurality of pixels are connected, respectively; a first signal storage unit for accumulating pixel signals transferred from the pixels by the plurality of vertical output lines; a second signal storage unit for accumulating the pixel signal which is transferred from the first signal storage unit; and a horizontal transfer unit for horizontally transferring the pixel signal accumulated in the second signal storage unit, wherein while the pixel signals are transferred from the pixels to the first signal storage unit by the plurality of vertical output lines, the pixel signals which have already been accumulated in the second signal storage unit are horizontally transferred by the horizontal transfer unit".

According to the above Patent Literature, since the period of time during which the pixel signals are transferred from the pixels to the first signal storage unit, that is, a period which covers a predetermined portion of the horizontal blanking period, and the horizontal transfer period can be simultaneously parallelized, the high-speed read-out can be performed. The "period which covers a predetermined portion" is called "first horizontal blanking period" hereinbelow.

However, according to the above Patent Literature, nothing is disclosed about a transfer of the pixel signals from the first signal storage unit to the second signal storage unit, and such a transfer cannot be parallelized with any one of the horizontal transfer and the transmission to the first signal storage unit. Therefore, even if the technique of the above Patent Literature is used, a period obtained by subtracting the first horizontal blanking period from a horizontal blanking period in the related art (such a period is hereinbelow called "second horizontal blanking period" and it coincides with a transfer period of the pixel signals from the first signal storage unit to the second signal storage unit) remains as read-out time simply added for the number of vertical lines.

On the other hand, a technique for shortening the horizontal blanking period itself has also been proposed. According to the Official Gazette of Japanese Laid-Open Patent Application Laid-Open No. 2004-134867 (Patent Literature 2), a driving method of an image pickup element which can realize such a technique is disclosed. That is, there is disclosed "a solid-state image pickup apparatus constructed by arranging a plurality of unit cells each having a plurality of photoelectric conversion elements each for converting an optical signal into a signal electric charge to be accumulated and one amplification element which receives the signal electric charge of each of the photoelectric conversion elements and outputs a signal corresponding to the signal electric charge, wherein the solid-state image pickup apparatus has a read-out circuit system which is connected to an output line of the amplification element and inputs a signal that is output from the unit cell through the output line, and the read-out circuit system has a differentiation unit which inputs a first signal corresponding to a reset level of an input unit of the amplification element, a second signal which is provided by adding a signal corresponding to the signal electric charge accumulated in at least one of the plurality of photoelectric conversion elements to the first signal, and a third signal which is provided by adding a signal corresponding to the signal electric charge accumulated in at least one of the plurality of photoelectric conversion elements to the second signal and obtains differences among a plurality of combinations of any two of the three input signals.

According to the above Patent Literature, since the input unit of the amplification element is shared by the plurality of photoelectric conversion elements, the input unit of the amplification element is not reset for a plurality of number of times, each time the signal corresponding to the signal electric charge of each element is transferred, and the signal corresponding to the reset level can be also used in common. Therefore, such an advantage that a time for resetting the input unit of the amplification element and a period for transferring the signal corresponding to the reset level after the resetting can be reduced by a time corresponding to the number which is the number of photoelectric conversion elements which share the input unit of the amplification element−1 is obtained.

However, according to the above Patent Literature, the horizontal blanking period and the horizontal transfer period are perfectly separated with respect to the time and such a construction that they can be parallelized as disclosed in Patent Literature 1 is not provided. Therefore, with respect to a point of attainment of the high-speed read-out, its effect lies only within a range of a shortening of the horizontal blanking period.

Moreover, in order to realize the further high-speed read-out by combining the simultaneous parallelization of the first horizontal blanking period and the horizontal transfer period (Patent Literature 1) and the shortening of the horizontal blanking period (Patent Literature 2), there are the following problems in which they cannot be simply combined. That is, in the case of applying the driving method of the image pickup element according to Patent Literature 2 to the construction of the image pickup element and its driving method according to Patent Literature 1, the transfer from the first signal storage unit to the second signal storage unit and the transfer of the added signals from the photoelectric conversion elements to the first signal storage unit cannot be simply parallelized. This is because it is necessary to provide the capacitors of the number of added signals+1 (+1 is a necessary number of capacitors to accumulate the signal corresponding to the reset level) as a first signal storage unit. The reason is that when the signal is transferred from the first signal storage unit to the second signal storage unit (during the second horizontal blanking period), a new added signal cannot be transferred to the two first signal storage units regarding a differentiation processing accompanied with the horizontal transfer which is executed just after the transfer period. If the driving method of the image pickup element according to Patent Literature 2 is combined, in spite of a fact that the larger the number of added signals is, the higher the effect of the shortening of the horizontal blanking period is, it is accompanied with an increase in the number of capacitors of the storage unit. This results in an increase in chip area. In such a situation that a space on the chip is decreased in association with the pitch-narrowing in the pixel column direction caused by fine scaling due to the large number of pixels, a difficulty occurs in a layout itself of the capacitors of the storage unit.

SUMMARY OF THE INVENTION

It is an object of the invention to provide a solid-state image pickup element in which a transfer of added signals from photoelectric conversion elements to a first signal storage unit and a transfer from the first signal storage unit to the second signal storage unit can be parallelized without arranging a number of capacitors serving as a first signal storage unit as mentioned above.

According to an aspect of the invention, a solid-state image pickup element comprises: a plurality of first signal storage units, at least a first predetermined number of which are connected to each vertical output line to store a signal transferred from a selected unit cell to the vertical output line; and a plurality of second signal storage units, at least a second predetermined number of which are connected to each vertical output line to store signals transferred from the first signal storage units of the first predetermined number, wherein the plurality of first signal storage units and the plurality of second signal storage units are selectively driven such that in a period of time for selectively driving the first signal storage unit to store the signal transferred to the vertical output line by driving a signal read-out unit of the selected unit cell, another first signal storage unit connected to the vertical output line and the second signal storage unit to store the signal transferred from the another first signal storage unit are selectively driven.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The exemplary embodiments of the invention will be described in detail hereinbelow with reference to the drawings.

First, a whole construction of an image pickup apparatus having a solid-state image pickup element according to the embodiment of the invention will be described.

Figure 1:
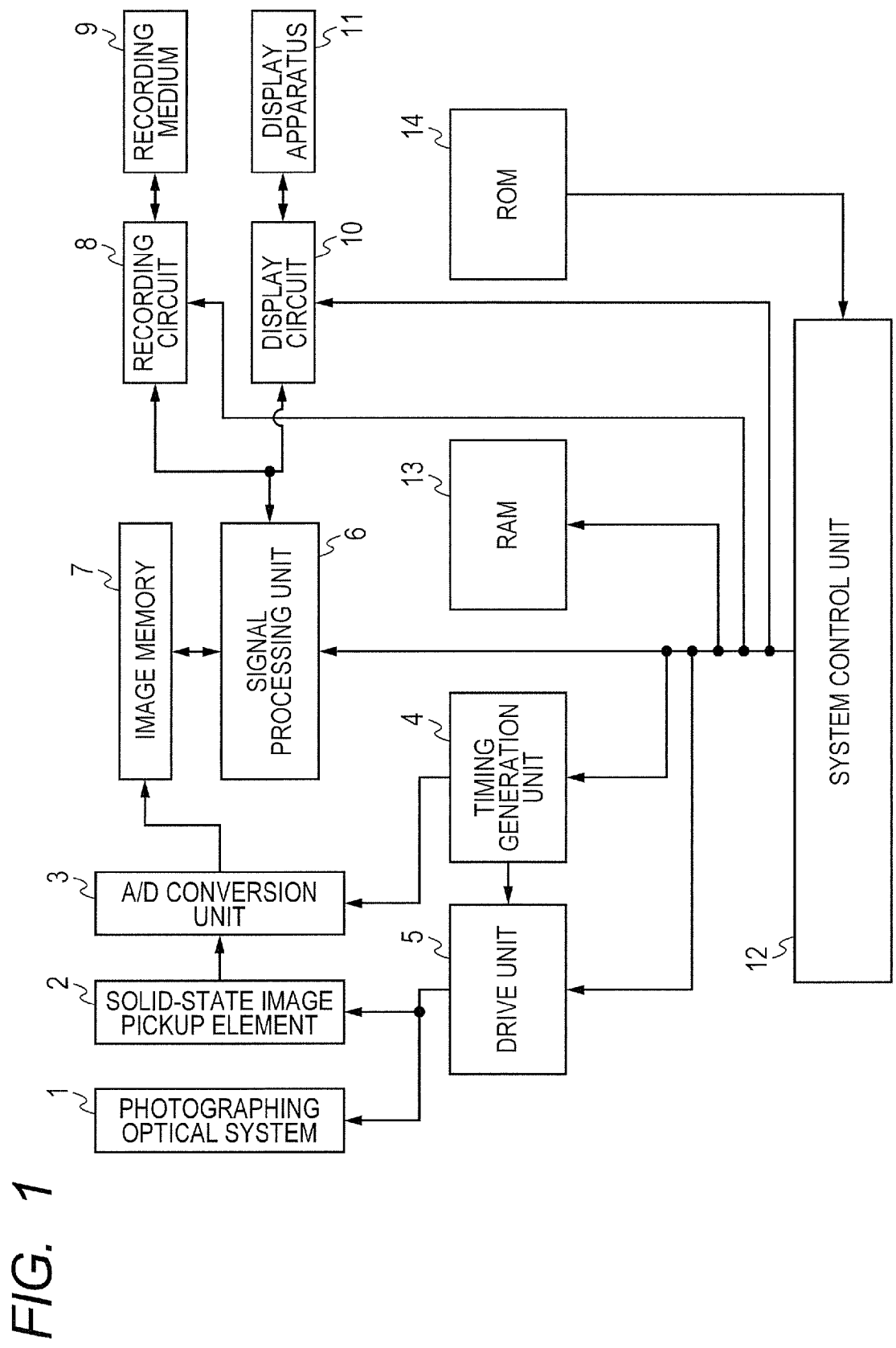
FIG. 1 is a block diagram illustrating a whole construction of an image pickup apparatus according to the invention.

FIG. 1 is a block diagram illustrating the whole construction of an image pickup apparatus according to the invention. In FIG. 1, a photographing optical system 1 such as a lens and the like includes an iris and a mechanical shutter.

A solid-state image pickup element 2 photoelectrically converts an object image focused by the photographing optical system 1 and obtains an electric signal. The solid-state image pickup element 2 which is features of the invention will be described in detail in the embodiments hereinafter.

An A/D conversion unit 3 converts an analog signal which is output from the solid-state image pickup element 2 into a digital signal.

The digital image signal is stored into an image memory 7 and subjected to various kinds of signal processings such as white balance correction, gamma correction, and the like by a signal processing unit 6. The image signal subjected to the signal processings is recorded into a recording medium 9 by a recording circuit 8. The recording circuit 8 is also an interface circuit with the recording medium 9.

The image signal can be also directly displayed to a display apparatus 11 such as a liquid crystal display or the like through a display circuit interface 10. The display apparatus 11 can also perform a live view display for continuously displaying a picture plane to be photographed from now on in a live manner or a reproduction display of a recorded moving image.

A timing generation unit 4 generates a timing signal for driving an image pickup system such as photographing optical system 1, solid-state image pickup element 2, and the like through a drive unit 5. Further, the timing generation unit 4 also generates a timing signal for driving and controlling the A/D conversion unit 3 synchronously with the driving of the image pickup system and an output signal of the solid-state image pickup element 2. Since features of the driving method of the solid-state image pickup element of the present invention relate to a function of the timing generation unit 4, they will be described in detail hereinafter.

A system control unit 12 controls the whole image pickup apparatus by executing a program which is temporarily stored in a volatile memory 13. The memory 13 is also used as a work memory upon execution of the program.

The program and various kinds of data to be transferred upon execution of the processings are stored in a non-volatile memory 14.

First Embodiment

Subsequently, a construction of the solid-state image pickup element 2 having a construction serving as features of the embodiment will be described in detail.

Figure 2:
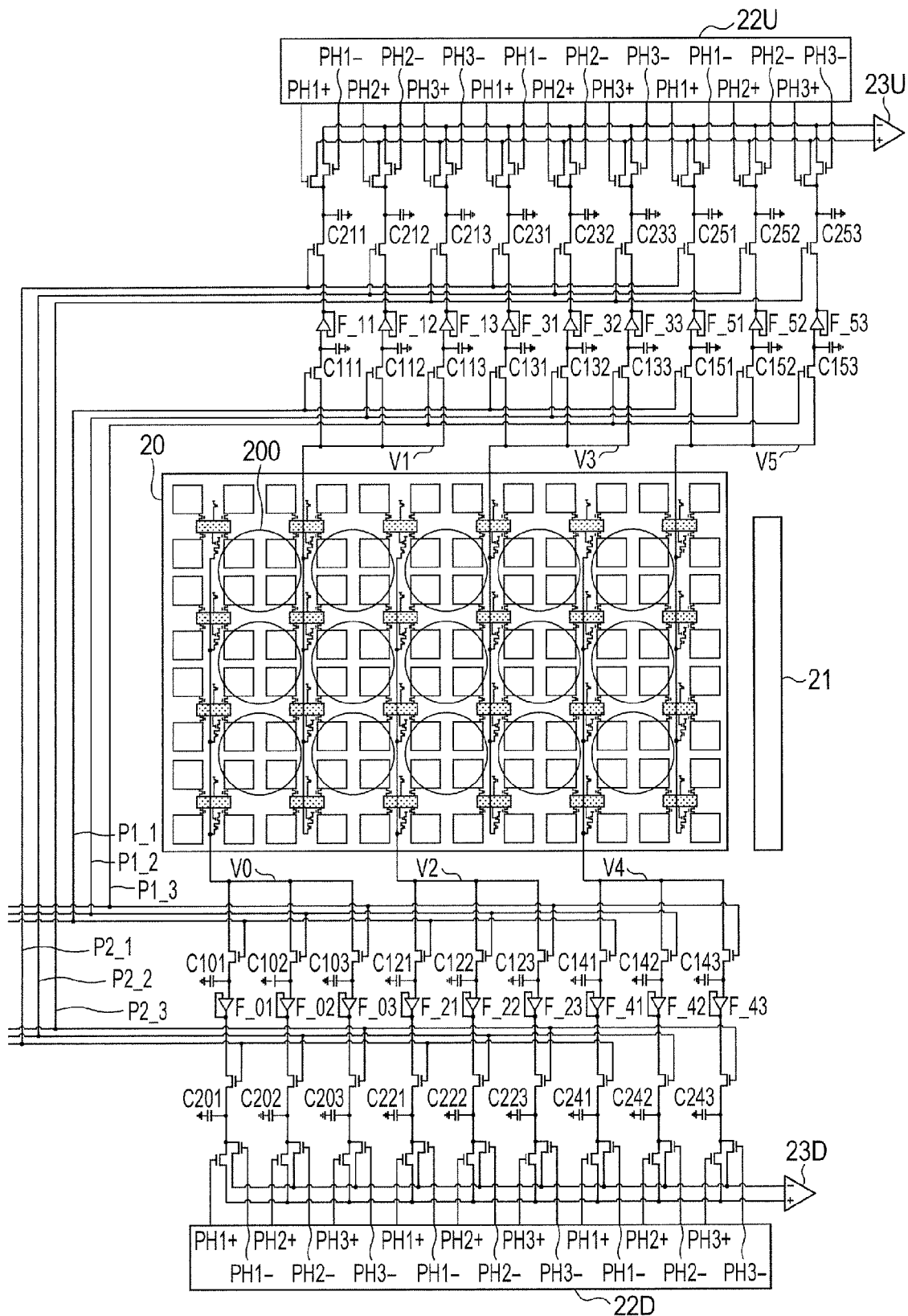
FIG. 2 is a constructional diagram of a solid-state image pickup element according to the first embodiment of the invention.

FIG. 2 is an equivalent circuit diagram illustrating the construction of the solid-state image pickup element 2 according to the embodiment. The solid-state image pickup element 2 has a pixel area 20 in which an object should be focused by the photographing optical system 1. Unit cells each including a plurality of photoelectric conversion elements are two-dimensionally arranged in the pixel area 20 vertically (in the column direction) and horizontally (in the row direction) at regular intervals. In the diagram, each unit cell includes four photoelectric conversion elements and the unit cells are two-dimensionally arranged in a matrix form of 4 rows and 6 columns. Although a construction of the unit cell is not so clear in the diagram, it is enlargedly illustrated in detail in FIG. 3.

Figure 3:
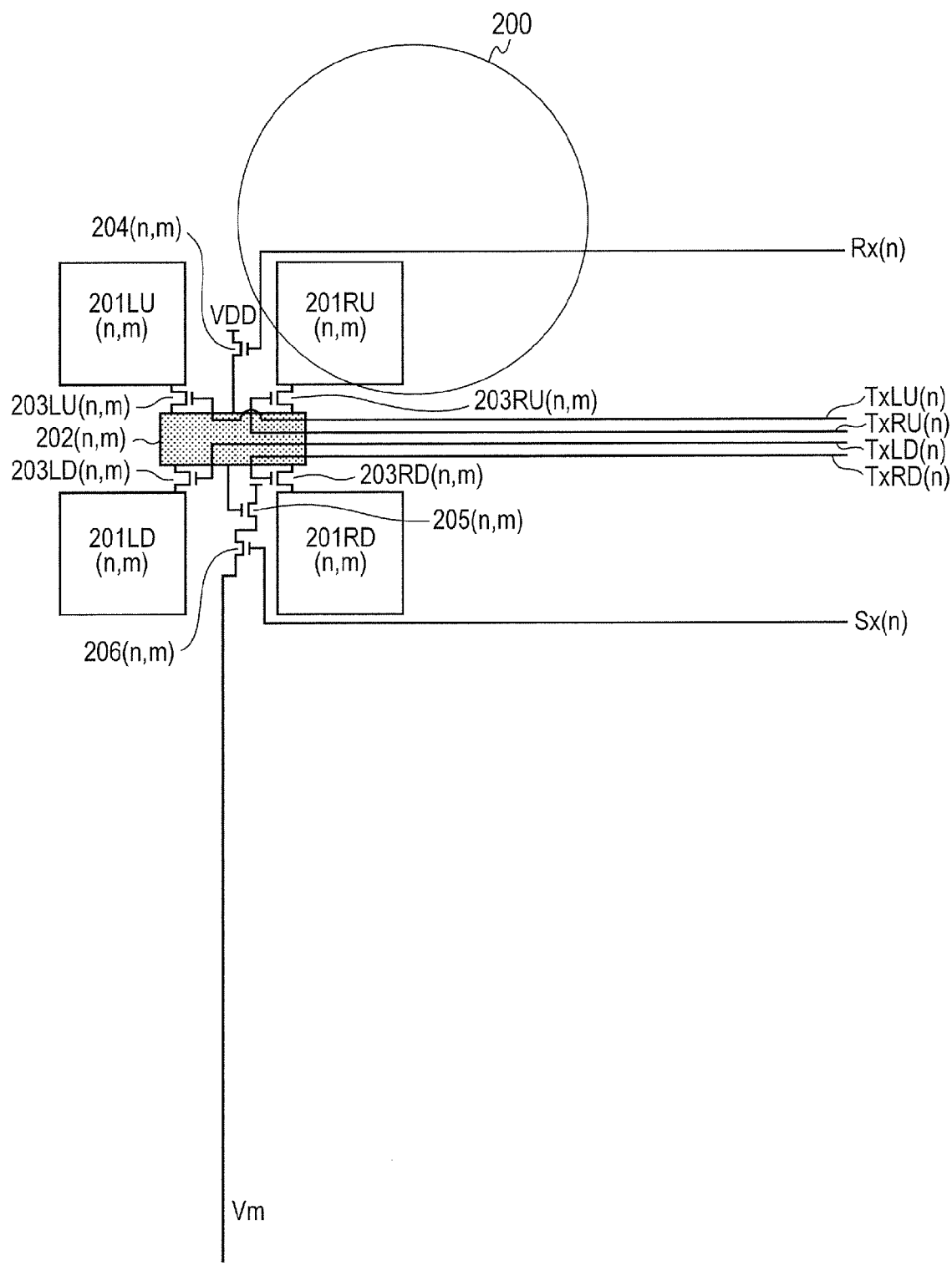
FIG. 3 is an equivalent circuit diagram illustrating a construction of a unit pixel of the solid-state image pickup element according to the first embodiment of the invention.

FIG. 3 is an equivalent circuit diagram for describing the construction of the unit pixel of the solid-state image pickup element 2 illustrated in FIG. 2. In the following whole description, (n,m) denotes a position of the nth row and the mth column in a unit cell arrangement in the pixel area 20. Therefore, all component elements in one unit cell have the same position (n,m).

Four symbols LU, RU, LD, and RD denote photoelectric conversion elements existing in the unit cell in order of the left upper, right upper, left lower, and right lower positions on the diagram.

A microlens 200(n,m) covers one or a plurality of photoelectric conversion elements within its radius. A correspondence relation between the photoelectric conversion elements and the microlens is substantially an arbitrary relation in the embodiment and the number of photoelectric conversion elements in the unit cell which are covered within the radius is not limited either.

201LU(n,m), 201RU(n,m), 201LD(n,m), and 201RD(n,m) denote photoelectric conversion elements in the unit cell, respectively. The photoelectric conversion element includes an N type semiconductor region and also functions as an electric charge accumulation portion.

The signal electric charges generated in the photoelectric conversion elements are transferred to a charge-voltage conversion unit 202(n,m) through transfer transistors 203LU(n,m), 203RU(n,m), 203LD(n,m), 203RD(n,m), respectively. In correspondence to the four transfer transistors, four control lines TxLU(n), TxRU(n), TxLD(n), TxRD(n) of the transfer transistors exist.

In the invention, a group of a set of photoelectric conversion elements which share the charge-voltage conversion unit 202 through each transfer transistor, and amplification transistors (which will be described hereinafter) connected to the charge-voltage conversion unit is called a "unit cell".

When the control line of the transfer transistor is in a high state, the corresponding transfer transistor is turned on. When the control line is in a low state, the corresponding transfer transistor is turned off. Since the control line is provided in common to a plurality of photoelectric conversion elements which are arranged in the horizontal direction, an index is expressed so as to depend only on "n" showing the row number as mentioned above. The charge-voltage conversion unit 202 also includes an N type semiconductor region and also functions as an electric charge accumulation portion in a manner similar to the photoelectric conversion element. The function as an electric charge accumulation portion is selectively used merely before and after the signal electric charge transfer from the photoelectric conversion element to the charge-voltage conversion unit 202.

The charge-voltage conversion unit 202 further can be reset to a power voltage VDD at a period of a timing chart, which will be described hereinafter, through a reset transistor 204(n,m) (resetting unit) which is turned on and off by a control line Rx(n). By supplying a high signal to the control line Rx(n), the reset transistor is turned on and the resetting is performed. Since the reset transistor is turned off after completion of the resetting, the charge-voltage conversion unit 202 is set into an electrically floating state. When the signal electric charge is transferred from the photoelectric conversion element, an electric potential decreases more than the power voltage VDD by an amount corresponding to the transferred signal electric charge. Therefore, by reading it as a signal, an analog electric signal is output. Such a processing is a function of the unit cell. The electric potential corresponding to the signal electric charge is a potential provided by dividing a signal electric charge amount by a capacitance which the charge-voltage conversion unit 202 has, and multiplying an obtained value by a voltage amplification factor of a source follower circuit constructed to be connected to a vertical output line Vm, which will be described hereinafter.

The charge-voltage conversion unit 202 is connected to a gate of an amplification transistor 205(n,m) and constructs a source follower circuit together with a constant current source (not shown) connected to the vertical output line Vm when a selection transistor 206(n,m) (transfer unit) is turned on by a control line Sx(n,m). Thus, the potential corresponding to the signal electric charge is transferred to the vertical output line Vm.

Each vertical output line Vm is connected in common to a plurality of unit cells arranged in the vertical direction and corresponds to a plurality of charge-voltage conversion units 202 arranged in the horizontal direction in a one-to-one corresponding manner. Therefore, an index is expressed so as to depend only on "m" showing the column number.

Each element of the construction for conversion from the signal electric charge into the voltage, signal amplification, and the like as mentioned above is an element which has conventionally been well known. The features on the construction of the invention relate to the high-speed signal read-out driving method using the unit cells in each of which the group of the photoelectric conversion elements which share the charge-voltage conversion unit 202 through the transfer transistor, and the amplification transistor connected to the charge-voltage conversion unit are combined as mentioned above.

FIG. 2 illustrates the construction of the solid-state image pickup element 2 according to the embodiment in which the unit cells illustrated in FIG. 3 are arranged vertically and horizontally at regular intervals in a matrix form of 4 rows×6 columns. However, the arrangement number (4 rows×6 columns) of the unit cells in the pixel area 20 is a number which is set for simplification of description of the embodiment and, practically, a pixel arrangement of about hundreds to thousands of pixels is used. In FIG. 2, control lines Rx(n), TxLU (n), TxRU(n), TxLD(n), TxRD(n), and Sx(n) regarding the unit cells are omitted to avoid complexity. They are controlled in an interlocking relational manner with a designation of a vertical row by a vertical scanning circuit, which will be described hereinafter.

The vertical output line Vm is connected in common to four rows with respect to the vertical direction. On the other hand, total six vertical output lines (V0 to V5) exist with respect to the six charge-voltage conversion units arranged in the horizontal direction in a one-to-one corresponding manner. The three vertical output lines (V1, V3, V5) of the half number among the six vertical output lines are connected to a first signal storage unit arranged in an upper position of the diagram. The remaining three vertical output lines (V0, V2, V4) are connected to a first signal storage unit arranged in a lower position of the diagram. As will be described hereinafter, the first output terminal exists in an upper position of the diagram, the second output terminal exists in a lower position of the diagram, and a construction of multi-channelization in which they are separated into even-number columns and odd-number columns and signals are output in parallel is provided.

Capacitors C1m1, C1m2, and C1m3 of the first signal storage unit are connected in parallel to an edge portion of each vertical output line Vm on the side which is not the unit cell side. Therefore, a function as a memory of one row of the unit cell for accumulating and transferring the electric potential of the vertical output line Vm as a signal is realized. In a well-known CMOS type solid-state image pickup element in the related art, there is an element in which two memories such as memory corresponding to the potential after the transfer of the signal electric charge and memory corresponding to the potential before the transfer of the signal electric charge are provided. It is one of the features of the present invention that three (first predetermined number) first signal storage units are provided for one vertical output line in order to perform the high-speed signal read-out driving. The driving method of efficiently controlling those three first signal storage units is also one of the features of the present invention.

Control lines of the transistors for transferring the signals to the capacitors C1m1, C1m2, and C1m3 of the first signal storage unit are shown by P1_1, P1_2, and P1_3, respectively. Control signals which are supplied to them are sent from the drive unit 5 through the timing generation unit 4 under control of the system control unit 12.

An amplifying circuit for amplifying a signal voltage may be provided at a front stage of the first signal storage unit. Although the amplifying circuit is widely used because it is useful as a unit for reducing noises in a dark object at the time of photographing at a high ISO, since it is not a construction which is indispensable to the invention, it is omitted in FIG. 2.

Capacitors C2m1, C2m2, and C2m3 serving as a second signal storage unit are arranged in series at a post stage of the first signal storage unit. They realize the function as a memory of one row for further accumulating the potentials of the capacitors C1m1, C1m2, and C1m3 of the first signal storage unit as signals. The number (second predetermined number) of capacitors constructing the second signal storage unit of each column of the unit cell may be set to 2 instead of 3. A specific construction in the case where the two capacitors are used will be described in the third embodiment.

Control lines of the transistors for transferring the signals to the capacitors C2m1, C2m2, and C2m3 of the second signal storage unit are shown by P2_1, P2_2, and P2_3, respectively. Control signals which are supplied to them are also supplied from the drive unit 5 through the timing generation unit 4 under control of the system control unit 12. This is true of other control lines, which will be described in other embodiments.

What are called voltage follower circuits F_m1, F_m2, and F_m3 are provided as buffers just before the second signal storage unit. The voltage follower circuit has a function of transferring an electric potential that is equal to the potential stored in the first signal storage unit to the second signal storage units.

A vertical scanning circuit 21 sends a row designation signal for sequentially turning on the foregoing transfer transistor, reset transistor, and selection transistor in the vertical direction in accordance with timing charts, which will be described hereinafter.

Horizontal scanning circuits 22U and 22D have a function of sequentially scanning in the horizontal direction so that the potentials accumulated in the capacitors C2m1, C2m2, and C2m3 of the second signal storage unit are output to an output terminal 23U or 23D, respectively. The output terminals 23U and 23D have a construction of, for example, a differential circuit for performing a subtraction between the potential after the transfer of the signal electric charge and the potential (for example, reset potential) before the transfer of the signal electric charge and outputting a subtraction result. Thus, what is called an S-N signal in which noises are already removed can be obtained. Like Patent Literature 2, a difference signal between the different added signals can be also obtained and output as a signal corresponding to the signal electric charge of the single photoelectric conversion element.

In addition to the inherent scanning function, the horizontal scanning circuits 22U and 22D include two transistors for horizontal transfer with respect to each capacitor of the second signal storage unit in order to change a sign of the potential on the horizontal output line which is input to the differential circuits 23U and 23D. By conduction control of those two horizontal transfer transistors, the difference signal between the different added signals can be freely obtained. PH1+, PH1−, PH2+, PH2−, PH3+, and PH3− in the horizontal scanning circuits 22U and 22D denote horizontal scanning signal control lines regarding the conduction control, respectively. The operation will be described in detail with reference to timing charts, which will be described hereinafter.

The signal lines connected to the differential circuits 23U and 23D serving as output terminals are also called "horizontal output lines". There is also a case where outputs of the horizontal scan and the difference signal are collectively called "horizontal transfer".

In the horizontal transfer, since the transfer potential from the second signal storage unit to the horizontal output line decreases to a value of capacitance division ratio C2/(C2+

CH) times between a capacitance C2 of the second signal storage unit and a capacitance CH of the horizontal output line, a difference between the decreased potentials is output from the output terminals.

In the horizontal transfer, since the unit cells arranged in a plurality of columns are sequentially scanned in the horizontal direction with respect to the signals of one row, the lowered potential from the second signal storage unit is read out so-called destructively in the horizontal direction while losing information thereof in the horizontal output line.

On the other hand, since the control lines P2_1, P2_2, and P2_3 are in the off state in a horizontal transfer period, the potential of the first signal storage unit is not destroyed in the horizontal direction but is held so long as it is not reset by a new signal transfer. Further, since the voltage follower circuits F_m1, F_m2, and F_m3 are provided just before the second signal storage unit, the potential which does not depend on the capacitance division can be transferred again to the second signal storage unit.

Figure 4:
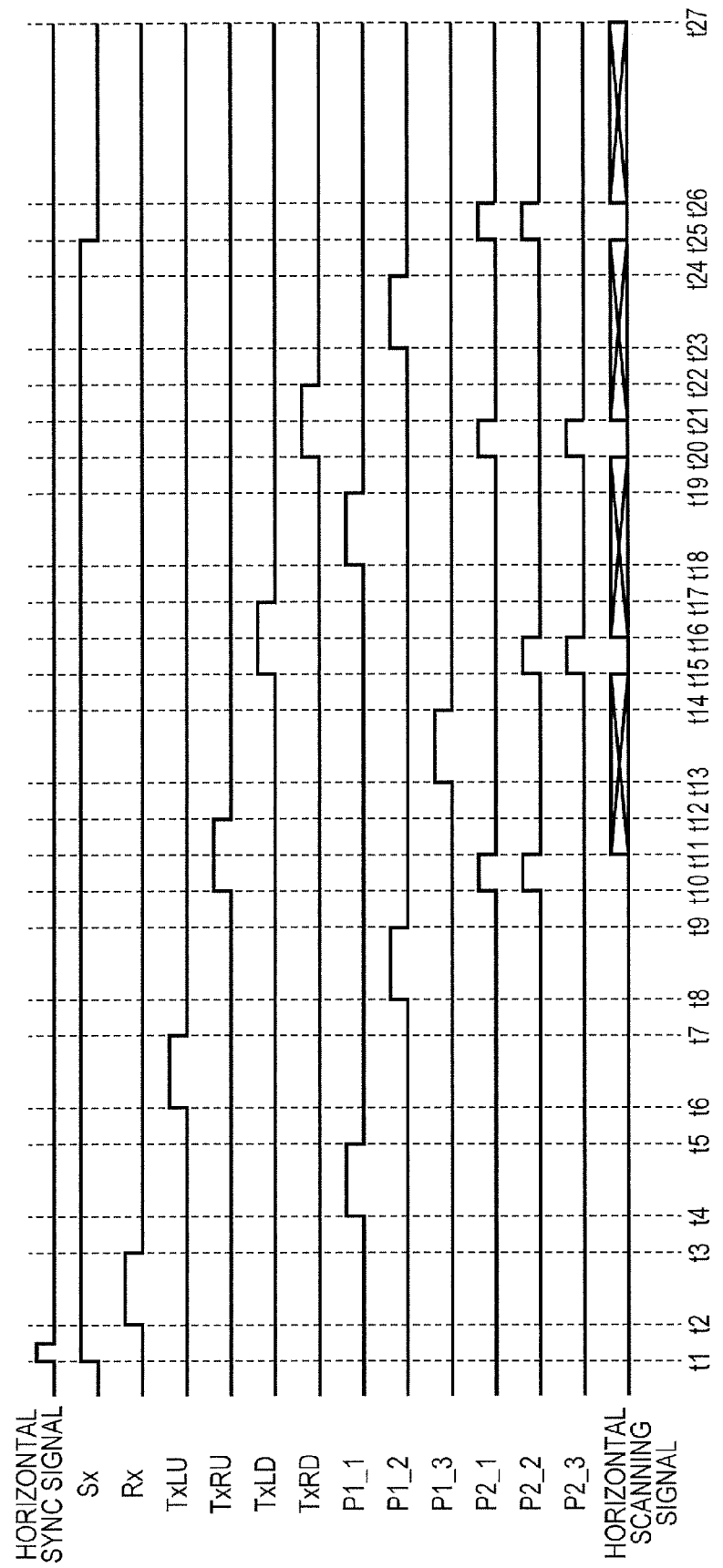
FIG. 4 is a diagram illustrating a timing chart for describing a driving method of the solid-state image pickup element according to the first embodiment of the invention.

FIG. 4 illustrates a timing chart for realizing the driving method of the solid-state image pickup element according to the invention. The timing chart of FIG. 4 is realized by the timing generation unit 4 under the control of the system control unit 12. The operation of the solid-state image pickup element 2 will be specifically described hereinbelow with reference to the timing chart.

FIG. 4 illustrates a time-dependent change of a state of each control line in the case where the vertical scanning circuit 21 selected the nth row as shown by a horizontal sync signal. Therefore, when the operation illustrated in FIG. 4 is completed, the vertical scanning circuit 21 selects the (n+1)th row and repeats the operation illustrated in FIG. 4. Such a repetition is continued hereinbelow until there remains no selectable row.

At time t1 in FIG. 4, together with the leading of the horizontal sync signal, the control line Sx(n) of the selection transistor 206(n,m) of the selected row (nth row) rises and all of the unit cells corresponding to the selected nth row are connected to the vertical output line Vm (m=0~5).

At time t2, the control line Rx(n) of the reset transistor 204(n,m) of the nth row rises and all of the charge-voltage conversion units 202(n,m) of the unit cells existing in the nth row are reset to the power voltage VDD. In this manner, the potential of the charge-voltage conversion unit 202(n,m) is set to a value which is almost equal to VDD. Such a potential state hardly changes even at a point of time when the control line Rx(n) is trailed at time t3 and the reset transistor 204(n,m) is turned off. Although the horizontal sync signal trailed before time t2, since it is sufficient that the high state is maintained only for a sufficient period of time as information which the sync signal has, trailing time is not limited. Since the reset transistor 204(n,m) is turned off at time t3, the charge-voltage conversion unit 202(n,m) is in a floating state.

At time t4, the control line P1_1 is raised in order to transfer, as a signal, the detailed potential of the charge-voltage conversion unit 202(n,m) which is in such a floating state, to the memory of one row constructed by the capacitors C1m1 (m=0~5). The control line P1_1 trails at time t5 in FIG. 4.

Subsequently, at time t6, the control line TxLU(n) of the transfer transistor 203LU(n,m) rises and all of the signal electric charges which are photoelectrically converted and accumulated in the photoelectric conversion element 201LU (n,m) are transferred to the charge-voltage conversion unit 202(n,m). After waiting for time t7 when the time enough to transfer the signal electric charges already elapses, the control line TxLU(n) trails.

At time t8, the control line P1_2 is raised in order to transfer the potential provided by adding the potential corresponding to the signal electric charge of the photoelectric conversion element 201LU(n,m) to the foregoing potential in the floating state, as signals of one row to the capacitors C1m2 (m=0~5) of the first signal storage unit. The control line P1_2 trails at time t9.

The period until the point of time mentioned above is a period of time corresponding to the first horizontal blanking period in the related art in the drive timing of the solid-state image pickup element 2 according to the invention. In the related arts as well as Patent Literature 1, since the difference between the photoelectric conversion signal and the signal corresponding to the reset potential is output, the first horizontal blanking period is completed at this point of time. On the other hand, in the solid-state image pickup element in which the added signal provided by adding the signal electric charge of another photoelectric conversion element is read out, which is a feature of Patent Literature 2, since the voltage of a new signal electric charge component is sequentially added to the voltage of the charge-voltage conversion unit 202, the first horizontal blanking period is further continued.

On the other hand, according to Patent Literature 1, after the first horizontal blanking period which is completed at time t9, a transfer period from the first signal storage unit to the second signal storage unit has to be provided as a second horizontal blanking period independent of the horizontal transfer period. Conventionally, even in a case where read-out of the added signal is continued, it may be considered only to provide an independent second horizontal blanking period, so that it does not result in a decrease in read-out time. Moreover, the capacitors serving as a first signal storage unit of the number as many as the number of added signals have to be arranged in parallel, so that a circuit space is also largely consumed in vain.

According to the invention, an attention is paid to such a point of the circuit space and, first, the technique of Patent Literature 1 is developed by parallelizing a part of the horizontal blanking period and the second horizontal blanking period by the following driving method. Second, the capacitors of the first signal storage unit in which the accumulated charges became unnecessary by the parallelization are sequentially reused in order to transfer the signal to which the photoelectric conversion signal electric charge is newly added from the charge-voltage conversion unit 202. Thus, even if the number of adding times increases, an advantage of the high-speed read-out by the added signal can be obtained only by using at least three capacitors for one vertical output line.

Subsequently, drive timing of the period of the embodiment corresponding to the second horizontal blanking period will be described with reference to FIG. 4. Although a period corresponding to the second horizontal blanking period is started from time t10 in FIG. 4, the transfer of the new added signal is also simultaneously started. The parallelization lies in such a point as mentioned above.

First, the second horizontal blanking period will be described and, immediately after that, the transfer of the new added signal which progresses simultaneously therewith will be also described. At time t10, control lines P2_1 and P2_2 are raised and a transistor for transfer from the capacitor C1m1 of the first signal storage unit to the capacitor C2m1 of the second signal storage unit and a transistor for transfer from the capacitor C1m2 to the capacitor C2m2 are turned on. As mentioned above, the signal corresponding to the reset potential of the floating diffusion layer portion of the charge-voltage conversion unit 202(n,m) is transferred to the capacitor C1m1, and the potential provided by adding the potential corresponding to the signal electric charge of the photoelectric conversion element 201LU(n,m) to the reset potential is transferred as a signal to the capacitor C1m2. According to the function of the voltage follower circuits F_m1, F_m2, and F_m3, it will be understood that the above two potentials are perfectly transferred to the capacitors C2m1 and C2m2 of the second signal storage unit. After the elapse of the time enough to transfer, at time t11, the control lines P2_1 and P2_2 are trailed and the operation can be shifted to the horizontal transfer period during which the difference between the two signals is output.

In parallel with the second horizontal blanking period, the transfer of the new added signal to the first signal storage unit is performed. In a manner similar to the above, at time t10, the control line TxRU(n) of the transfer transistor 203RU(n,m) rises and all of the signal electric charges which are photoelectrically converted and accumulated in the photoelectric conversion element 201RU(n,m) are transferred to the charge-voltage conversion unit 202(n,m). After waiting for time t12 when the time enough to transfer the signal electric charges already elapses, the control line TxRU(n) trails.

Subsequently, at time t13, the control line P1_3 is raised. Thus, the added signal is perfectly transferred as a signal to the memory of one row constructed by the capacitors C1m3 (m=0~5) of the first signal storage unit. The added signal at this time is a signal corresponding to the potential provided by adding the potential corresponding to the signal electric charge to which the signal electric charge of each of the photoelectric conversion elements 201LU(n,m) and 201RU(n,m) is added, to the reset potential. At time t14, the control line P1_3 trails.

In order to transfer the added signal to the first signal storage unit, first, it is necessary to transfer the signal electric charge to the charge-voltage conversion unit 202(n,m). However, in order to transfer a small amount of electric charge without leak thereof, a relatively long time is necessary. Particularly, when a gain rises at the time of photographing at a high ISO or the like, even small leak in the transfer of the small amount of electric charge appears on an image as a remarkable defect thereof. Also with respect to the signal transfer to the first signal storage unit after completion of the transfer of the signal electric charge, since a transfer delay occurs in dependence on a length corresponding to the vertical wirings of the pixel area 20, a relatively long time having a margin is necessary as so-called settling time. That is, a point that the signal transfer to the first signal storage unit, which is liable to become a bottleneck of the read-out time, can be started without waiting for the end of the second horizontal blanking period as mentioned above can become a key point for the high-speed read-out.

The reason why the parallelization as mentioned above can be performed is that at least three capacitors serving as a first signal storage unit are provided for one vertical output line.

The horizontal transfer of the first time, in which the signals of one row transferred from the capacitors C2m1 and C2m2 of the second signal storage unit are sequentially scanned in the horizontal direction, is executed by using a time zone of t15 (which will be described hereinafter) from arbitrary time after time t11 when the second horizontal blanking period has been finished. Although the horizontal scan is started before time t12 in FIG. 4, it is sufficient in the invention that it is started after time t11, and it is not parallelization which the present invention defines. However, in order to perform the high-speed read-out, it is desirable to start the horizontal transfer period of the first time soon after time t11.

A length of the horizontal transfer period of the first time is specified by a drive frequency which is an inverse number of transfer time for one signal and the number of ch (channels) prepared for the parallel output. In FIG. 4, an example is illustrated on the assumption that the end of the horizontal transfer period of the first time is the same as transfer start time t15 of the added signal from the first signal storage unit to the second signal storage unit. Thus, the signal transfer in the vertical direction and the signal transfer in the horizontal direction can be performed without interruption.

At time t15, the control lines P2_2 and P2_3 are raised and a transistor for transfer from the capacitor C1m2 of the first signal storage unit to the capacitor C2m2 of the second signal storage unit and a transistor for transfer from C1m3 to C2m3 are turned on. As mentioned above, the potential provided by adding the potential corresponding to the signal electric charge of the photoelectric conversion element 201LU(n,m) to the reset potential of the charge-voltage conversion unit 202 is held as a signal in C1m2. As mentioned above, the potential provided by adding the potential corresponding to the signal electric charge to which the signal electric charge of each of the photoelectric conversion elements 201LU(n,m) and 201RU(n,m) is added, to the reset potential of the charge-voltage conversion unit is held as a signal in C1m3.

There is a case where between the above two signals, the signal transferred to C1m2 is already transferred to C2m2 for a time interval from time t10 to 11. However, the signal of each column at that time is already destructively read out in the horizontal direction for the horizontal transfer period of the first time executed for a time interval from time t11 to t15. Therefore, it is necessary that not only the signal to which the photoelectric conversion signal electric charge is newly added and which is transferred to C1m3 is transferred as a signal to the capacitor C2m3 but also the signal held in C1m2 is transferred again to C2m2. According to the function of the voltage follower circuits F_m1, F_m2, and F_m3, the above two potentials are held in the first signal storage unit without being destroyed. Since they are perfectly transferred to the capacitors C2m2 and C2m3 of the second signal storage unit, the foregoing necessity can be satisfied.

After that, the transfer of the signal to which the photoelectric conversion signal electric charge is newly added to the first signal storage unit is executed in parallel with the second horizontal blanking period regarding the signal to which the photoelectric conversion signal electric charge is added. In a manner similar to the above, at time t15, the control line TxLD(n) of the transfer transistor 203LD(n,m) rises and all of the signal electric charges which is photoelectrically converted and accumulated in the photoelectric conversion element 201LD(n,m) (m=0~5) are transferred to the charge-voltage conversion unit 202(n,m). After waiting for time t17 when the time enough to transfer the signal electric charges already elapses, the control line TxLD(n) trails.

Subsequently, at time t18, the control line P1_1 is raised. Thus, the new added signal of one row is perfectly transferred as a signal to the capacitor C1m1 (m=0~5) of the first signal storage unit. The new added signal at this time is a signal corresponding to the potential provided by adding the potential corresponding to the signal electric charges to which the signal electric charge of each of the photoelectric conversion elements 201LU(n,m), 201RU(n,m), and 201LD(n,m) is added, to the reset potential. The control line P1_1 trails at time t19.

The horizontal transfer of the second time, in which the signals of one row read out to the capacitors of the second signal storage unit are sequentially scanned in the horizontal direction, is executed by using a time zone of t20 (which will be described hereinafter) from arbitrary time after time t16. Although the horizontal scan is started before time t17 in FIG. 4, it is sufficient that it is started after time t16, and it is not parallelization which the present invention defines. However, in order to perform the high-speed read-out, it is desirable to start the horizontal transfer period of the second time soon after time t16.

In a manner similar to the horizontal transfer period of the first time, a length of the horizontal transfer period of the second time is also specified by the drive frequency which is an inverse number of transfer time for one signal and the number of ch (channels) prepared for the parallel output.

In the horizontal transfer period of the first time, a signal corresponding to the signal electric charge of the photoelectric conversion element 201LU(n,m) in which the reset noises of the charge-voltage conversion unit 202 is removed is output.

In the horizontal transfer period of the second time, a signal corresponding to a difference signal between the signal electric charge of the photoelectric conversion element 201LU(n, m) in which the reset noises of the charge-voltage conversion unit are not removed and the sum of the signal electric charges of the photoelectric conversion elements 201LU(n,m) and 201RU(n,m) in which the reset noises are not removed is output. Therefore, such a signal can be handled as a signal corresponding to the signal electric charge of the photoelectric conversion element 201RU(n,m) in which the reset noises of the charge-voltage conversion unit 202 are removed.

As mentioned above, in the horizontal transfer period of the second time, a sign of the memory signal of one row held in the capacitor C2m2 of the second signal storage unit has to be inverted for the first horizontal transfer period when it is input to the differential circuits 23U and 23D. A driving method of the horizontal scanning circuits 22U and 22D will be described as an example with reference to a timing chart illustrated in FIG. 5.

Figure 5:
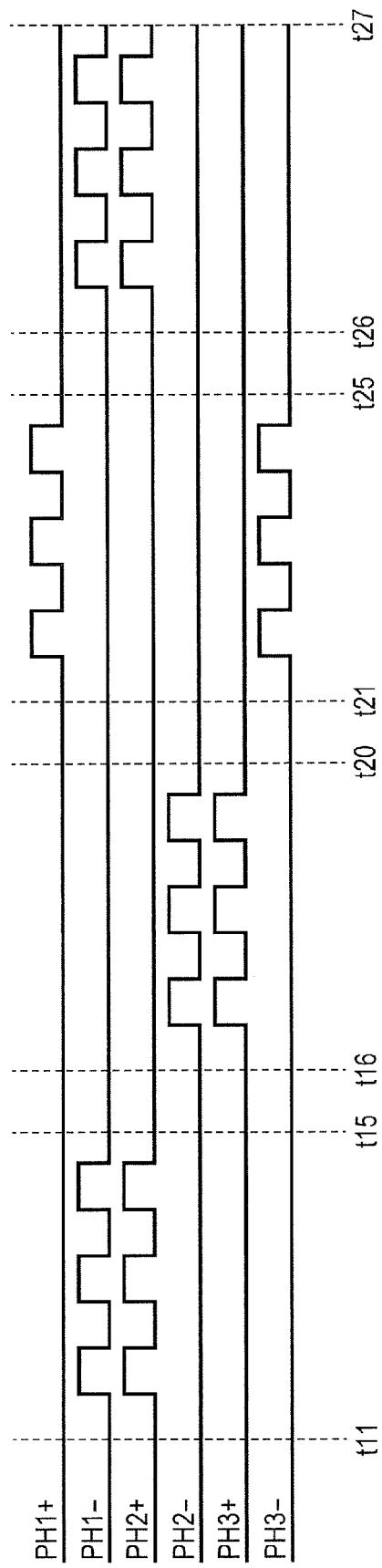
FIG. 5 is a diagram illustrating a timing chart for describing the driving method of the solid-state image pickup element according to the first embodiment of the invention.

As illustrated in the horizontal scanning circuits 22U and 22D in FIG. 2, horizontal scanning signals PH1+, PH1−, PH2+, PH2−, PH3+, and PH3− in FIG. 5 are control lines of the transistors for horizontal transfer, respectively. As for those transistors, one set of the two transistors are provided for each of the three capacitors C2m1, C2m2, and C2m3 of the second signal storage unit provided for each column. Thus, the signals held in the capacitors are sequentially selected in the horizontal direction, to determine which input terminal of the differential circuit 23U or 23D the signals are selectively supplied. It is sufficient that the control signal has a pulse-like form, and a leading edge and a trailing edge of such a signal are set to one period, to select the signals of one pixel. Notation regarding time t which is used in the following description are common to that used in FIG. 4.

In FIG. 5, a period from time t11 to t15 becomes the horizontal transfer period of the first time. In the horizontal transfer period of the first time, the control lines PH2+ and PH1− are in a busy state. Thus, in the second signal storage unit, the signal held in the capacitor C2m1 to which the reset potential of the charge-voltage conversion unit 202 is transferred is input to a negative side input terminal of the differential circuit 23U or 23D. The signal of the capacitor C2m2 to which the potential provided by adding the reset potential and the potential corresponding to the signal electric charge of the photoelectric conversion element 201LU(n,m) is transferred, is input to a positive side input terminal of the differential circuit 23U or 23D.

On the other hand, in the horizontal transfer period of the second time during which the signal transfer is executed for a period from time t16 to t20 in FIG. 5, the control lines PH2+ and PH1− are in a busy state. In this case, the capacitor C2m2 of the second signal storage unit is connected to the negative side input terminal of the differential circuit 23U or 23D. The potential provided by adding the reset potential of the charge-voltage conversion unit 202 and the potential corresponding to the signal electric charge of the photoelectric conversion element 201LU(n,m) is transferred to the capacitor C2m2 in this instance. The capacitor C2m3 to which the potential provided by further adding the potential corresponding to the signal electric charge of the photoelectric conversion element 201LU(n,m) to the potential mentioned above is transferred, is connected to the positive side input terminals of the differential circuit 23U or 23D.

The horizontal transfer which is already described in FIG. 4 corresponds to the horizontal transfer period of the second time until time t20. Although not described yet in FIG. 4, in the solid-state image pickup element of the embodiment, after that, there are a horizontal transfer period of the third time from time t21 to t25 and a horizontal transfer period of the fourth time from time t26 to t30. Since the busy control lines in the horizontal transfer periods of the third and fourth times can be easily understood in consideration of the description in conjunction with the timing chart of FIG. 4, its description is omitted and the description is returned to that of the timing chart of FIG. 4.

FIG. 5 and the above description merely relate to an example of the horizontal scan in the embodiment. Even if the construction and driving method are not perfectly identical to those mentioned above, the advantages which are peculiar to the present invention can be obtained.

Returning to FIG. 4, the second horizontal blanking period regarding the new added signal (LU+RU+LD) from time t20 and the read-out of the new added signal (LU+RU+LD+RD) will be described.

At time t20, the control lines P2_3 and P2_1 are raised and a transistor for transfer from the capacitor C1m3 of the first signal storage unit to the capacitor C2m3 of the second signal storage unit and a transistor for transfer from C1m1 to C2m1 are turned on. As mentioned above, the potential provided by adding the potential corresponding to the signal electric charge of each of the photoelectric conversion elements 201LU(n,m) and 201RU(n,m) to the reset potential of the charge-voltage conversion unit 202 has been transferred as a signal to the capacitor C1m3. The potential provided by adding the potential corresponding to the signal electric charge to which the signal electric charge of each of the photoelectric conversion elements 201LU(n,m), 201RU(n,m), and 201LD (n,m) is added, to the reset potential of the charge-voltage conversion unit 202 is transferred as a signal to the capacitor C1m1.

In parallel with the second horizontal blanking period regarding the new added signal (LU+RU+LD), the transfer of the new added signal (LU+RU+LD+RD) to the first signal storage unit is performed. In a manner similar to that mentioned above, at time t20, the control line TxRD(n) of the transfer transistor 203RD(n,m) rises, and all of the signal electric charges which are photoelectrically converted and accumulated in the photoelectric conversion element 201RD (n,m) are transferred to the charge-voltage conversion unit 202(n,m). After waiting for time t22 when the time enough to transfer the signal electric charges already elapses, the control line TxRD(n) trails.

Subsequently, at time t23, the control line P1_2 is raised. Thus, the new added signal of one row is perfectly transferred as a signal to the capacitor C1m2 of the first signal storage unit. The new added signal at this time is a signal corresponding to the potential provided by adding the potential corresponding to the signal electric charges to which the signal electric charge of each of the photoelectric conversion elements 201LU(n,m), 201RU(n,m), 201LD(n,m), and 201RD (n,m) is added, to the reset potential. The control line P1_2 trails at time t24.

The horizontal transfer of the third time, in which the signals of one row read out to the capacitors of the second signal storage unit are sequentially scanned in the horizontal direction, is executed by using a time zone until t25 (which will be described hereinafter) from arbitrary time after time t21. Although the horizontal scan is started before time t22 in FIG. 4, it is sufficient that it is started after time t21, and it is not parallelization which the present invention defines. However, in order to perform the high-speed read-out, it is desirable to start the horizontal transfer period of the third time soon after time t21.

The signal which is output in the horizontal transfer period of the third time is a signal corresponding to a difference signal between the following sums (1) and (2) of the signal electric charges in which the reset noises of the charge-voltage conversion unit 202 are not removed: that is, (1) the sum of the signal electric charges of the photoelectric conversion elements 201LU(n,m) and 201RU(n,m); and (2) the sum of the signal electric charges of the photoelectric conversion elements 201LU(n,m), 201RU(n,m), and 201LD(n,m). Therefore, such a signal can be handled as a signal corresponding to the signal electric charges of the photoelectric conversion elements 201LD(n,m) in which the reset noises of the charge-voltage conversion unit are removed.

Subsequently, at time t25, the control lines P2_1 and P2_2 are raised and a transistor for transfer from the capacitor C1m1 of the first signal storage unit to the capacitor C2m1 of the second signal storage unit and a transistor for transfer from C1m2 to C2m2 are turned on. As mentioned above, the potential provided by adding the potential corresponding to the signal electric charge of each of the photoelectric conversion elements 201LU(n,m), 201RU(n,m), and 201LD(n,m) to the reset potential of the charge-voltage conversion unit 202 is transferred as a signal to the capacitor C1m1. In a manner similar to that mentioned above, the potential corresponding to the signal electric charge provided by adding each of the following signal electric charges to the reset potential of the charge-voltage conversion unit 202 is transferred as a signal to the capacitor C1m2: that is, the signal electric charge of each of the photoelectric conversion elements 201LU(n,m), 201RU(n,m), 201LD(n,m), and 201RD(n,m).

Subsequently, the horizontal transfer of the fourth time, in which the signals of one row read out to the capacitors of the second signal storage unit are sequentially scanned in the horizontal direction, is executed by using a time zone of t27 from arbitrary time after time t26. In the horizontal transfer period of the fourth time, the signal corresponding to the signal electric charge of the photoelectric conversion element 201RD(n,m) in which the reset noises of the charge-voltage conversion unit 202 are removed can be obtained.

With respect to a construction after time t25, since it is unnecessary to construct the source follower circuits in which the unit cells are connected to the vertical output line Vm, at time t25, the control line Sx(n) is trailed in order to turn off the selection transistor 206(n,m).

The timing chart in the driving method according to the embodiment illustrated in FIG. 4 has been described above.

The technical advantages of the embodiment will now be summarized. First, since the three first signal storage units are provided for each column, simultaneously with the start of the second horizontal blanking period, the read-out of the new added signal which is liable to become a bottleneck of the read-out time can be started. Thus, the high-speed read-out can be performed. Second, the signal corresponding to the signal electric charge provided by adding the signal electric charges of two or more photoelectric conversion elements is sequentially transferred to the capacitor of the first signal storage unit which holds the signal which became unnecessary after the differential output. Therefore, the number of capacitors of the first signal storage unit can be set to three for each column. The second technical advantage is larger for to a unit cell construction which can use the signal provided by adding the signal electric charges of the larger number of photoelectric conversion elements. That is, assuming that the number of photoelectric conversion elements constructing the unit cell is equal to N, in such a construction that one charge-voltage conversion unit is provided for N (≥3) or more photoelectric conversion elements, the larger a value of N is, the larger the advantage is. Although the number of photoelectric conversion elements included in the unit cell is set to 4 in order to simplify the description in the embodiment, when considering such an advantage, the invention can be applied to a CMOS solid-state image pickup element having unit cells each having three or more photoelectric conversion elements.

The timing chart of FIG. 4 used in the description so far merely relates to an example for specifically describing the advantages of the invention, and various modifications are considered.

According to the embodiment described above, in the CMOS solid-state image pickup element having the unit cells each having three or more photoelectric conversion elements, the number of capacitors for each column can be set to 3 and the high-speed read-out using the signal provided by adding the signal electric charge of each element can be performed.

Although the first embodiment is described with respect only to the horizontal scanning operation of the nth row, even when the next row is selected and the similar horizontal scanning operation is started, the parallelization of the horizontal blanking periods can be performed in a similar manner to the first embodiment. Such a construction will be described as an application example of the first embodiment with reference to FIG. 6.

Figure 6:
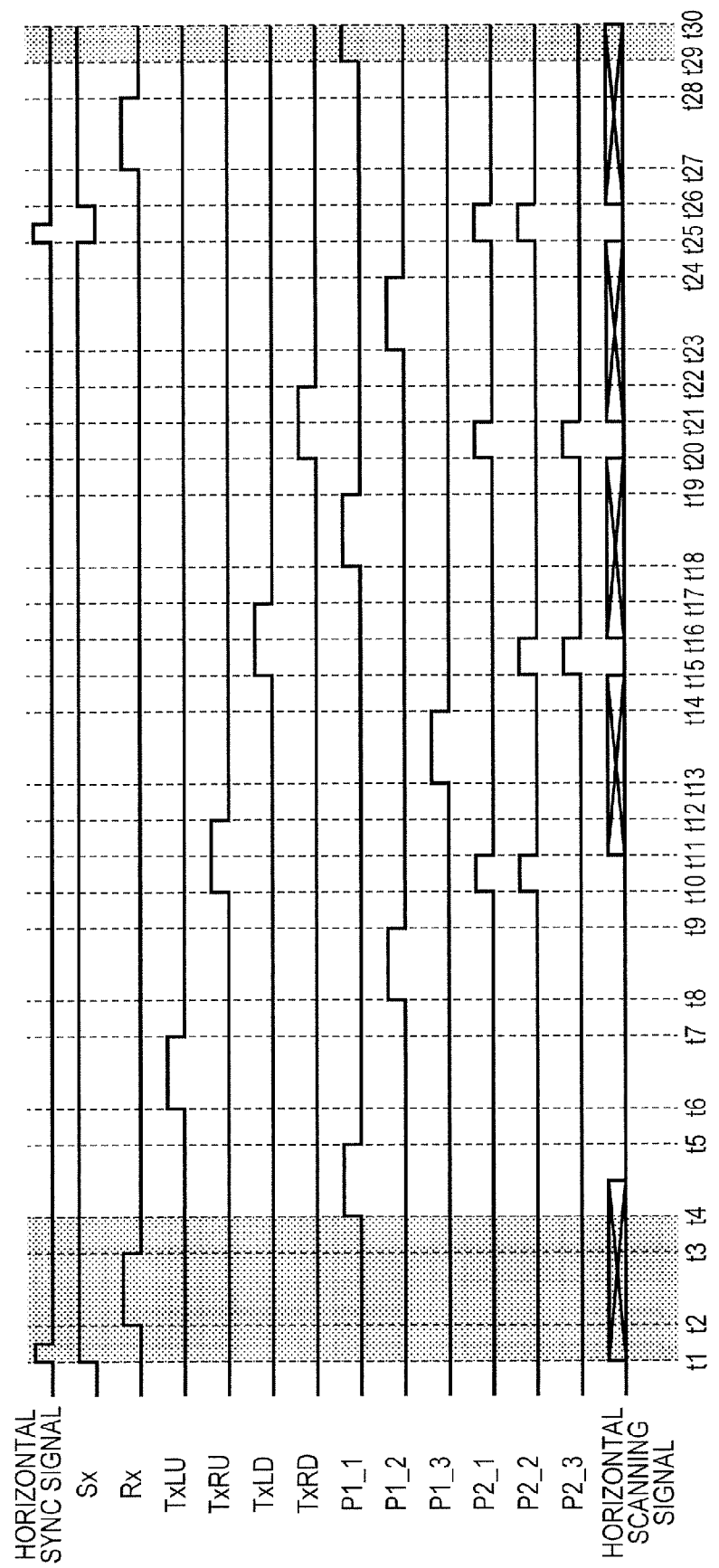
FIG. 6 is a diagram illustrating a timing chart for describing the driving method of the solid-state image pickup element according to the first embodiment of the invention.

In FIG. 6, a control line Sx(n+1) of the selection transistor which is trailed at time t25 is again raised at time t26 and the selection of the unit cell existing on the (n+1)th row is started. This is because after the horizontal transfer period of the fourth time of the signal transfer for the nth row, which is executed for a period from time t26 to t30, it is unnecessary that the signal of the unit cell of the nth row is held in the first signal storage unit. Therefore, in the horizontal transfer period, the operation for resetting the charge-voltage conversion unit of the unit cell of the (n+1)th row and the transfer of the reset potential to the first signal storage unit are executed.

At time t27, a control line Rx(n+1) of the reset transistor rises and the charge-voltage conversion unit 202 of the (n+1) th row is reset to the power voltage VDD. At time t28, the control line Rx(n+1) trails and the charge-voltage conversion unit is set into a floating state. In order to transfer the potential in the floating state to the first signal storage unit, the control line P1_1 is raised at time t29.

The operation which is executed for a period from time t25 to t29 is similar to that for the period from time t1 to t4 in the nth row (FIG. 4). That is, since the operation for the period from time t1 to t4 in FIG. 4 can be executed in the last horizontal transfer period of the just-preceding row as shown in a hatched region in FIG. 6, the operation time can be reduced and it contributes to the further higher-speed read-out. Such an application example of the first embodiment can be also applied to embodiments subsequent to the second embodiment.

Second Embodiment

In the present embodiment, a construction in which two capacitors of the second signal storage unit can be provided for one vertical output line and the advantages peculiar to the invention can be obtained will be described.

Figure 7:
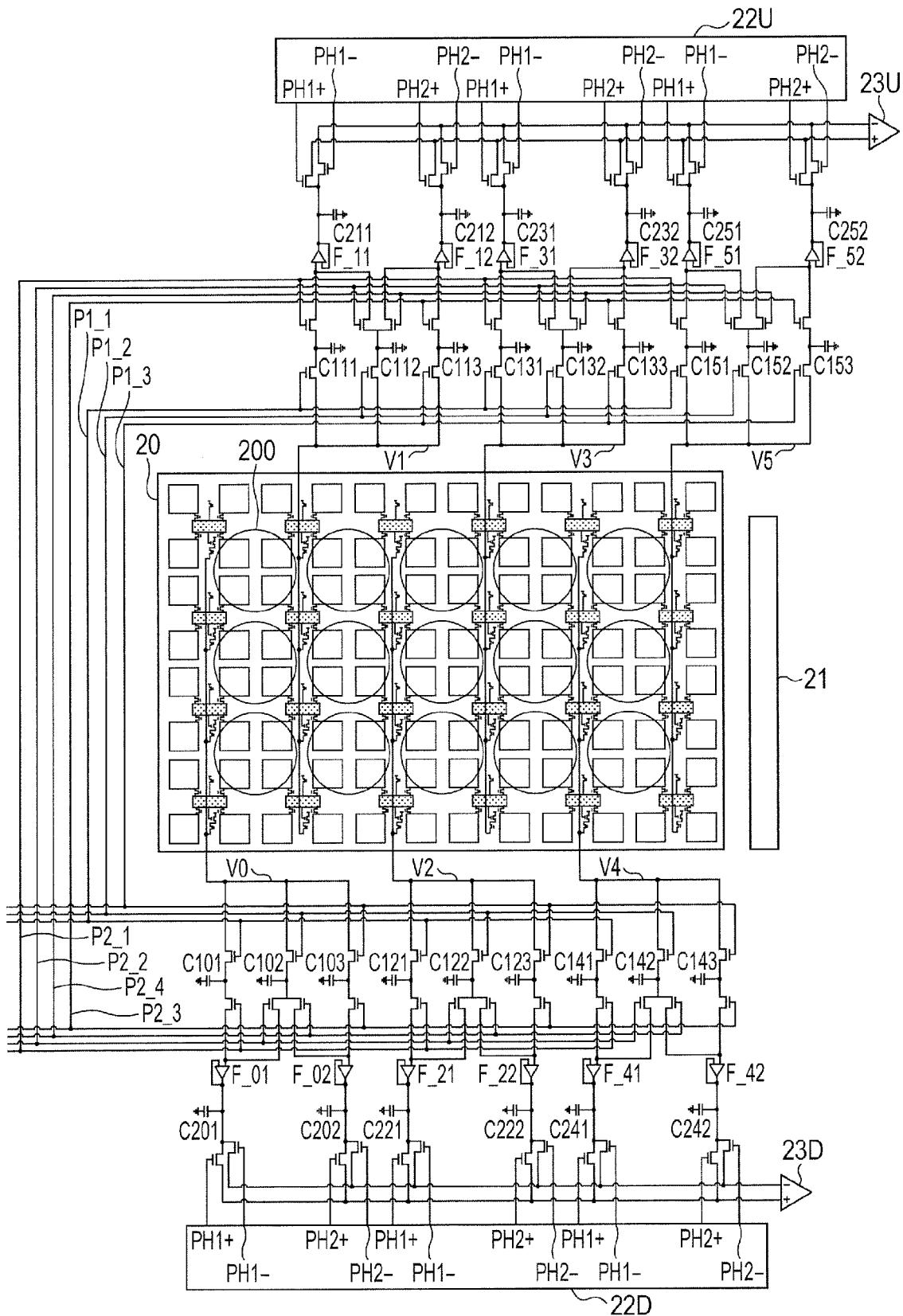
FIG. 7 is a constructional diagram of a solid-state image pickup element according to the second embodiment of the invention.

FIG. 7 is a diagram illustrating a construction of the solid-state image pickup element 2 according to the present embodiment. In the diagram, substantially the same portions as those in the construction in FIG. 2 are designated by the same reference numerals and their description is omitted unless otherwise necessary in particular.

The present embodiment differs from the solid-state image pickup element of FIG. 2 used in the description of the first embodiment with respect to the following four points. First, two capacitors C2m1 and C2m2 serving as a second signal storage unit are provided for one vertical output line. Second, in accordance with the two capacitors of the second signal storage unit, two voltage follower circuits F_m1 and F_m2 are provided before and after them. Third, in accordance with the two capacitors of the second signal storage unit, the number of horizontal scanning signals is reduced to four (PH1+, PH1−, PH2+, PH2−). Fourth, the number of transfer transistors for controlling the inputs from the first signal storage unit to the two voltage follower circuits is increased by one only for the capacitor C1m2 in the first signal storage unit, so that four transfer transistors are provided per vertical output line.

Since the number of capacitors, voltage follower circuits, and horizontal scanning signals of the second signal storage unit is reduced while adding the one transfer transistor, a circuit scale near the signal storage unit is smaller than that in the first embodiment.

It is assumed that a new control line of the one transfer transistor added for the capacitor C1m2 in the first signal storage unit is shown by P2_4 and a construction of the photoelectric conversion element in the embodiment will be described hereinbelow.

Figure 8:
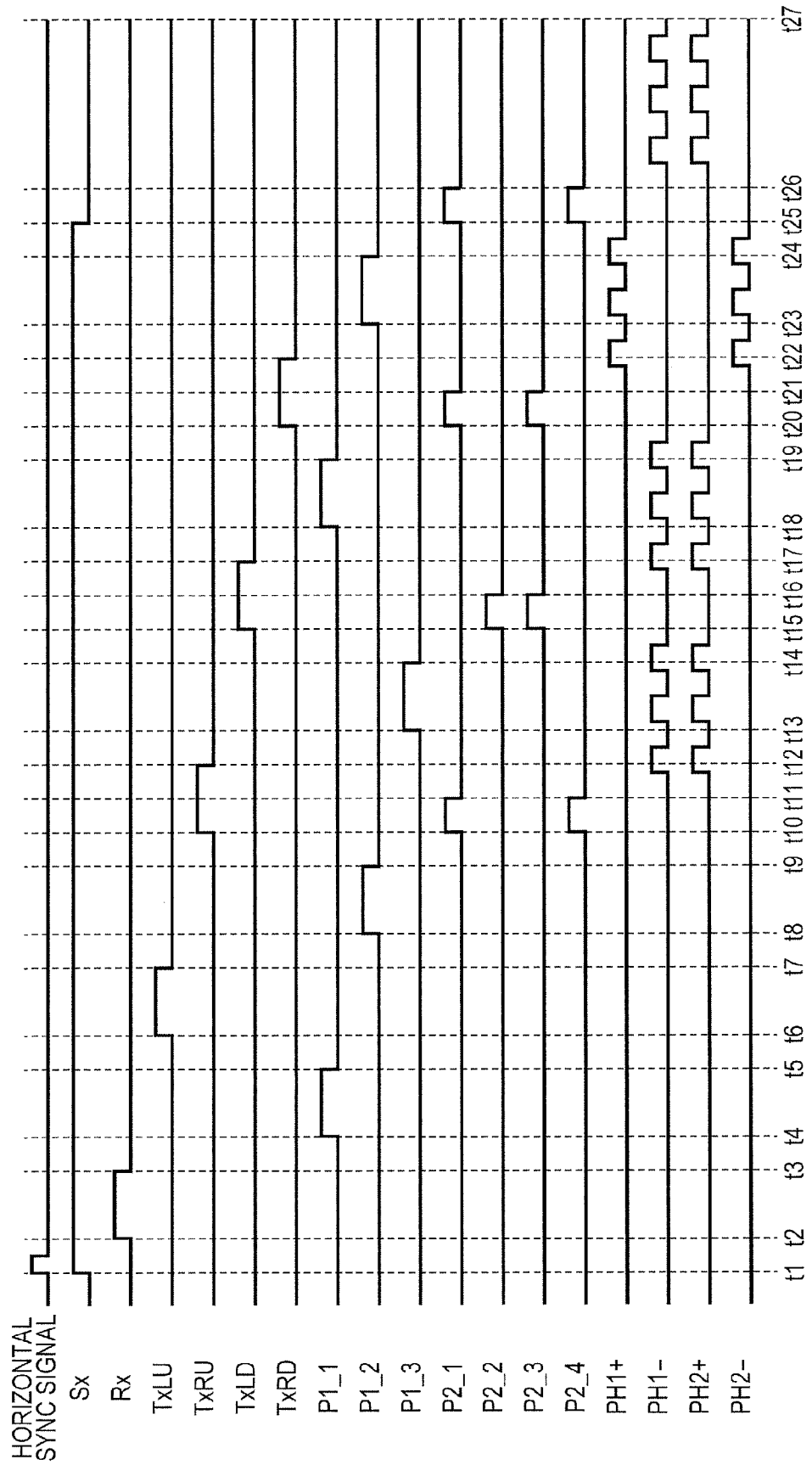
FIG. 8 is a diagram illustrating a timing chart for describing a driving method of the solid-state image pickup element according to the second embodiment of the invention.

FIG. 8 is a timing chart illustrating a driving method of the solid-state image pickup element 2 according to the embodiment illustrated in FIG. 7.

It differs from the timing chart illustrated in FIG. 4 with respect to the following two points. First, the signal of the control line P2_2 of the transfer transistors from C1m2 of the first signal storage unit to C2m1 and C2m2 of the second signal storage unit is changed, and a control line P2_4 is added. The other is that since the number of horizontal scanning signals is reduced, the horizontal transfer is simplified.

Since all of leading time and trailing time with respect to the control lines other than those mentioned above are the same as those in FIG. 2, their description is omitted. Among notation regarding time t which are used in the following description, the same notation as that illustrated in FIG. 4 indicates the same time.

FIG. 8 differs from FIG. 4 with respect to a point that, first, for a period from time t10 to t11, when the signal corresponding to the signal electric charge of the photoelectric conversion element 201LU(n,m) which is temporarily transferred to C1m2 of the first signal storage unit is further transferred to the second signal storage unit, it is transferred to C2m2 under control by the control line P2_4.

Subsequently, for a period from time t15 to t16, when the signal corresponding to the signal electric charge of the photoelectric conversion element 201LU(n,m) which is held in C1m2 of the first signal storage unit is transferred again to the second signal storage unit, it is transferred to C2m1 under control by the control line P2_2.

This is because it is necessary to obtain a difference between the added signal which is transferred to C1m3 of the first signal storage unit and subsequently transferred to C2m2 of the second signal storage unit in a period from time t10 to t14 and the foregoing signal which is transferred to the capacitor C2m1. The added signal which is transferred to C2m2 is a signal corresponding to the potential provided by adding the potential corresponding to the signal electric charge to which the signal electric charge of each of the photoelectric conversion elements 201LU(n,m) and 201RU(n,m) is added, to the reset potential.

The horizontal transfer of the first time is performed for a period from time t11 to t15 and the horizontal transfer of the second time is performed for a period from time t16 to t20. As will be understood from the above description, in any of the horizontal transfer periods, the signal in the capacitor C2m2 of the second signal storage unit is transferred to the positive side input terminals of the differential circuits 23U and 23D, and the signal in the capacitor C2m1 of the second signal storage unit is transferred to the negative side input terminals of the differential circuits 23U and 23D, respectively. Therefore, the control lines PH1− and PH2+ of the horizontal scanning signal are in a busy state.

Subsequently, in the signal transfer from the first signal storage unit to the second signal storage unit, which is performed for a period from time t20 to t26, since there is no transfer from C1m2 of the first signal storage unit, the same control as that in FIG. 4 is made.

The horizontal transfer period of the third time from time t21 to t25 differs from the horizontal transfer periods of the first and second times. That is, the signal in the capacitor C2m1 of the second signal storage unit is transferred to the positive side input terminals of the differential circuits 23U and 23D, and the signal in the capacitor C2m2 of the second signal storage unit is transferred to the negative side input terminals of the differential circuits 23U and 23D, respectively. Therefore, the control lines PH1+ and PH2− of the horizontal scanning signal are in a busy state.

The last added signal (LU+RU+LD+RD) from the photoelectric conversion element is transferred to the capacitor C1m2 of the first signal storage unit in a period from time t20 to t24.

This signal is transferred to C2m2 of the second signal storage unit in order to obtain a difference from the one-precedent added signal (LU+RU+LD) held in C1m1. Therefore, the control line P2_4 of the transfer transistor is set to the high state for a period from time t25 to t26.

In the horizontal transfer period of the fourth time, the control lines PH2+ and PH1− of the horizontal scanning signal enter the busy state, and a difference output regarding the last added signal is obtained.

In the embodiment, with respect to all of C1m1, C1m2, and C1m3 of the first signal storage unit, 6 (=3×2) transfer transistors which can transfer the signal to the two capacitors C2m1 and C2m2 of the second signal storage unit can be also provided. In this case, since C2m2 or C2m1 of the second signal storage unit can be always connected to the positive side input terminals of the differential circuits 23U and 23D and C1m2 or C2m2 can be always connected to the negative side input terminals thereof, only the two control lines of PH2+ and PH1− are sufficient as the control lines of the horizontal scanning signal.

The difference between the added signals is not obtained by the differential circuits but it is also possible to construct in such a manner that the negative side inputs are always set to the signal corresponding to the reset potential and the sum of the signal electric charges of the photoelectric conversion elements in the unit cell is sequentially obtained. For example, it is also possible to construct in such a manner that the capacitor C1m1 in the first signal storage unit is fixed to the signal corresponding to the reset potential, it is determined so as to always transfer to C1m1 of the second signal storage unit, and the number of transfer transistors regarding C1m1 of the first signal storage unit is set to 1. In this case, it is sufficient that C1m2 and C1m3 of the first signal storage unit are used as capacitors in which the added signals from the photoelectric conversion elements are sequentially held.

Third Embodiment

In the embodiment, a construction which can further simplify the control lines of the horizontal scanning signals as compared with that in the second embodiment will now be described.

Figure 9:
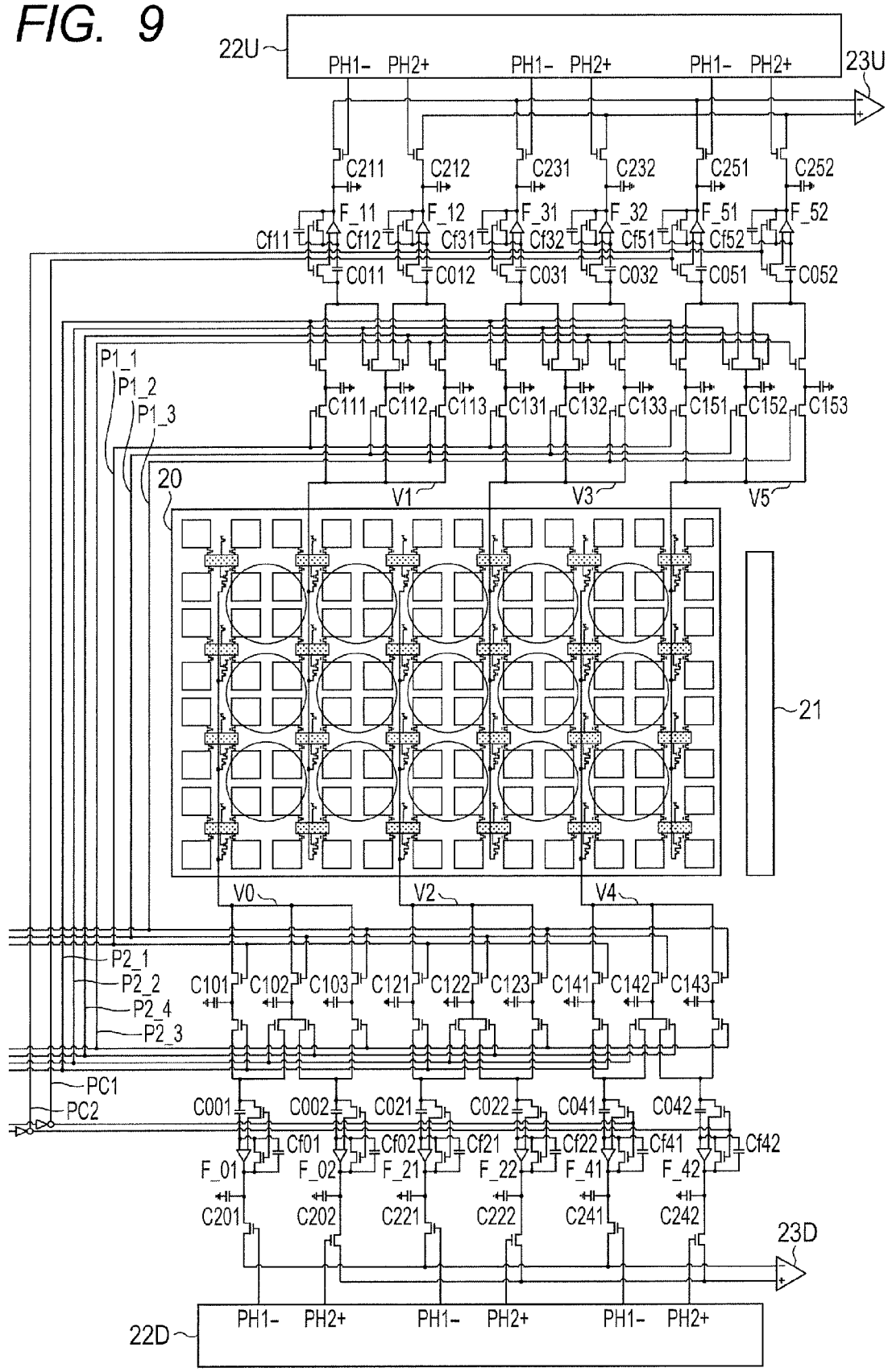
FIG. 9 is a constructional diagram of a solid-state image pickup element according to the third embodiment of the invention.

FIG. 9 is a diagram illustrating a construction of a solid-state image pickup element according to the present embodiment. In the diagram, substantially the same portions as those in the construction in FIG. 2 or FIG. 7 are denoted by the same reference numerals and their description is omitted unless otherwise necessary in particular.

The construction illustrated in FIG. 9 differs from that of the second embodiment illustrated in FIG. 7 with respect to the following points. That is, in addition to the function as a voltage follower, a function as an inverse amplification amplifier is added to each of operational amplifiers F_02 and F_02 arranged at the front stage of C2m1 and C2m2 of the second signal storage unit connected to the one vertical output line Vm.

Specifically speaking, such a construction that each operational amplifier is accompanied with two transistors for operation control and a reference voltage Vrf (not shown) is added. Gates of the two operation control transistors provided for one operational amplifier are connected to control line PC1 or PC2 every operational amplifier. When a signal of the control line PC1 or PC2 is at the high level, the operational amplifier functions as an inverse amplification amplifier. When it is at the low level, the operational amplifier functions as a voltage follower circuit. An inverter provided for each of the control lines PC1 and PC2 has a function for inverting a polarity of the signal added to the control line.

Assuming that C0m1=Cfm1 and C0m2=Cfm2, an amplification factor of the inverse amplification amplifier is equal to 1.0. Therefore, the sign of the signal which is transferred to the first signal storage unit can be determined only by the signal of the control line. In the case of the inverse amplification, an inverse potential in which the reference voltage Vrf is used as a reference is transferred and a negative potential does not actually occur.

It is an object of the switching between the voltage follower and the inverse amplification amplifier is to simplify the horizontal scanning circuits 22U and 22D so that the horizontal transfer can be performed by the function of only the control lines PH2+ and PH1−. That is, when the signal is transferred to the second signal storage unit, by changing its sign, the capacitor C2m1 of the second signal storage unit can be always (fixedly) connected to the negative side input terminal of the differential circuit 23U or 23D and C2m2 can be always connected to the positive side input terminal.

Figure 10:
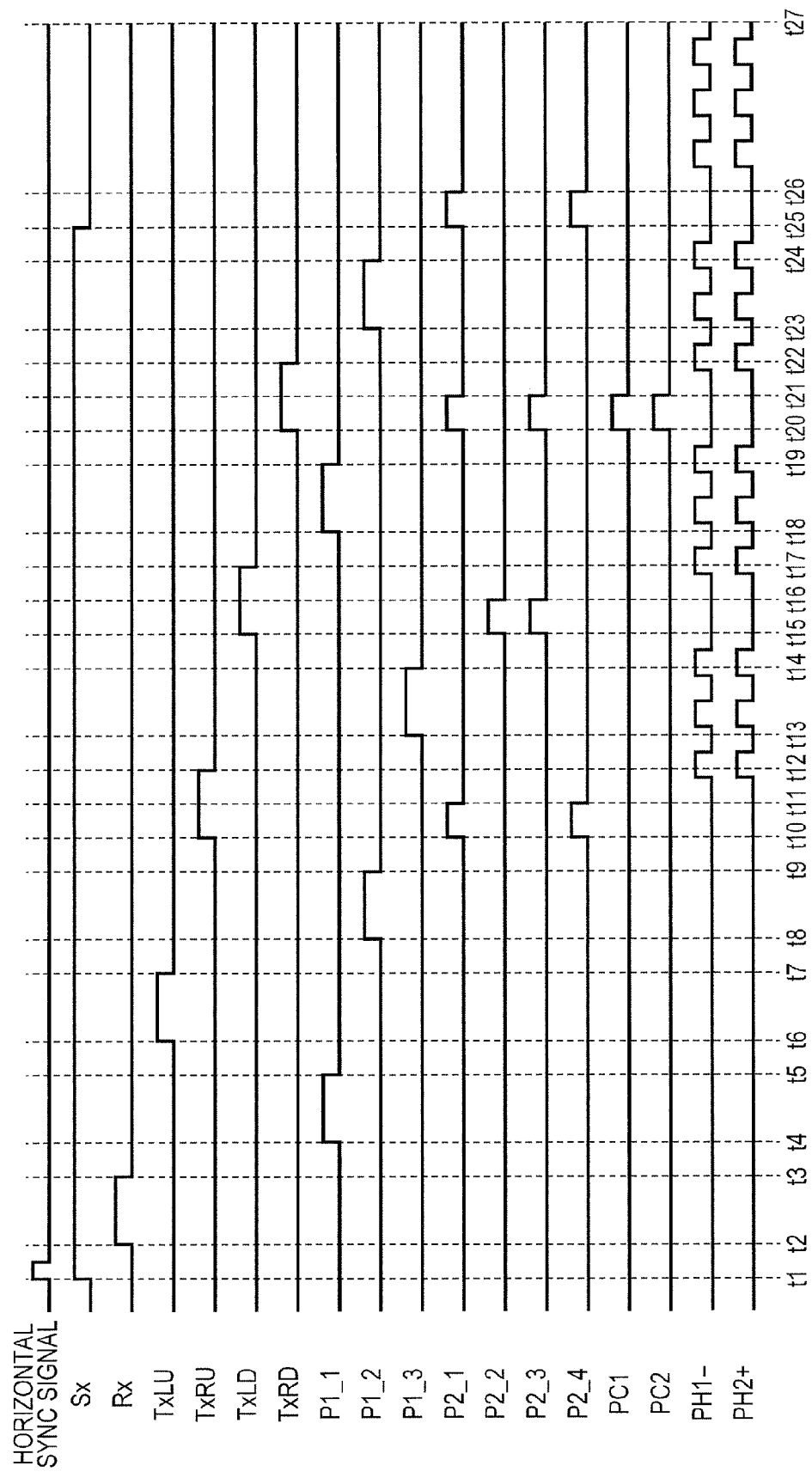
FIG. 10 is a diagram illustrating a timing chart for describing a driving method of the solid-state image pickup element according to the third embodiment of the invention.

FIG. 10 illustrates a timing chart for driving the solid-state image pickup element according to the embodiment illustrated in FIG. 9. The operation of the solid-state image pickup element according to the embodiment will be specifically described hereinbelow with reference to the drawings. Among notation regarding time t which are used in the following description, the same notation as that illustrated in FIG. 4 indicates the same time.

The timing chart illustrated in FIG. 10 differs from the timing chart regarding the second embodiment illustrated in FIG. 8 with respect to the following two points. First, it differs with respect to a so-called second horizontal blanking period of the signal transfer which is executed in a period from time t10 to t11, a period from time t15 to t16, a period from time t20 to t21, and a period from time t25 to t26. That is, the sign of the signal which is transferred from the first signal storage unit to the second signal storage unit is controlled every signal by using the control line PC1 or PC2. Second, the control signals for so-called a horizontal transfer which is executed in the period from time t11 to t15, the period from time t16 to t20, the period from time t21 to t25, and the period from time t26 to t27 are simplified in association with the foregoing first difference.

Since other constructions are not so different from the construction illustrated in FIG. 8, only a signal transfer structure at the times mentioned above will be described.

First, in the second horizontal blanking period of the signal transfer, which is executed for a period from time t10 to t11, the control lines PC1 and PC2 are also held in the low state. That is, both of the operational amplifiers F_m1 and F_m2 function as voltage follower circuits and the signal inversion of the second signal storage unit does not occur. In accordance with it, even in the period from time t11 to t15 serving as the horizontal transfer period of the first time, by setting PH2+ and PH1− into the busy state, the signal corresponding to the signal electric charge of the photoelectric conversion element 201LU(n,m) is output from the differential circuits 23U and 23D.

Subsequently, even in the second horizontal blanking period of the signal transfer which is executed in a period from time t15 to t16, the control lines PC1 and PC2 are also held in the low state. This is because it is also unnecessary here to cause the inversion of the signal which is transferred to the second signal storage unit. In accordance with it, even for a period from time t16 to t20 serving as a horizontal transfer period of the second time, by setting PH2+ and PH1− into the busy state, the signal corresponding to the signal electric charge of the photoelectric conversion element 201RU(n,m) is output from the differential circuits 23U and 23D.

On the other hand, in the second horizontal blanking period of the signal transfer which is executed for a period from time t20 to t21, both of the control lines PC1 and PC2 are set into the high state. That is, both of the operational amplifiers F_m1 and F_m2 function as inverse amplification amplifiers to attain the potential inversion of the signal which is transferred to the second signal storage unit occurs.

This is because since the busy state of PH2+ and PH1− is scheduled in the horizontal transfer period of the third time (from time t21 to t25), it is designed so that the signal corresponding to the signal electric charge of the photoelectric conversion element 201LD(n,m) is output from the differential circuits 23U and 23D.

Explaining in detail, when the potential signal corresponding to the signal electric charge provided by adding the signal electric charge of each of the photoelectric conversion elements 201LU(n,m), 201RU(n,m), and 201LD(n,m) to the reset potential is transferred to the capacitor C2m1 of the second signal storage unit, its sign is preliminarily inverted. Consequently, the sign is further inverted at the negative side input terminals of the differential circuits 23. On the other hand, when the signal potential corresponding to the signal electric charge provided by adding the signal electric charge of each of the photoelectric conversion elements 201LU(n,m)

and 201RU(n,m) to the reset potential is transferred to the capacitor C2m2 of the second signal storage unit, its sign is also preliminarily inverted. Thus, since the signal is input to the positive side input terminals of the differential circuits, the signal corresponding to the signal electric charge of the photoelectric conversion element 201LD(n,m) is output as a difference signal of the two input signals.

In the last second horizontal blanking period (from time t25 to t26) and the horizontal transfer period of the fourth time (from time t26 to t27) of the nth row, since there is no need to change the sign upon signal transfer, both of the control lines PC1 and PC2 are held in the low state.

It is not always necessary that the sign inverting operation that is peculiar to the present embodiment is executed at a front stage of the second signal storage unit. For example, it is also possible to construct in such a manner that the transistor for operation control in the present embodiment and the operational amplifier accompanied with the reference voltage Vrf (not shown) are added to the front stage of each of the capacitors C1m1, C1m2, and C1m3 of the first signal storage unit, thereby adding the function of the inverse amplification amplifier.

It will be understood from the above description that even by adding the sign inverting function using the operational amplifier, the advantage of the invention serving as parallelization of the read-out of the signal electric charge from the photoelectric conversion element and the signal transfer from the first signal storage unit to the second signal storage unit can be realized by the simpler construction.

Fourth Embodiment

In the third embodiment, the advantages of the invention are realized by such a construction that when the signal is transferred to the second signal storage unit, its sign can be freely switched in accordance with the necessity.

In the present embodiment, a sign change can be realized in a more unrestricted manner without providing the sign inverting function as described in the third embodiment. Specifically speaking, at the stage of transferring the signal to the first signal storage unit, two signals for positive and negative signs are prepared for the same signal. For this purpose, in the present embodiment, four capacitors of the first signal storage unit are provided for one vertical output line Vm and the two signals for positive and negative signs are always held in the transfer of the added signal in so-called the first horizontal blanking period.

Figure 11:
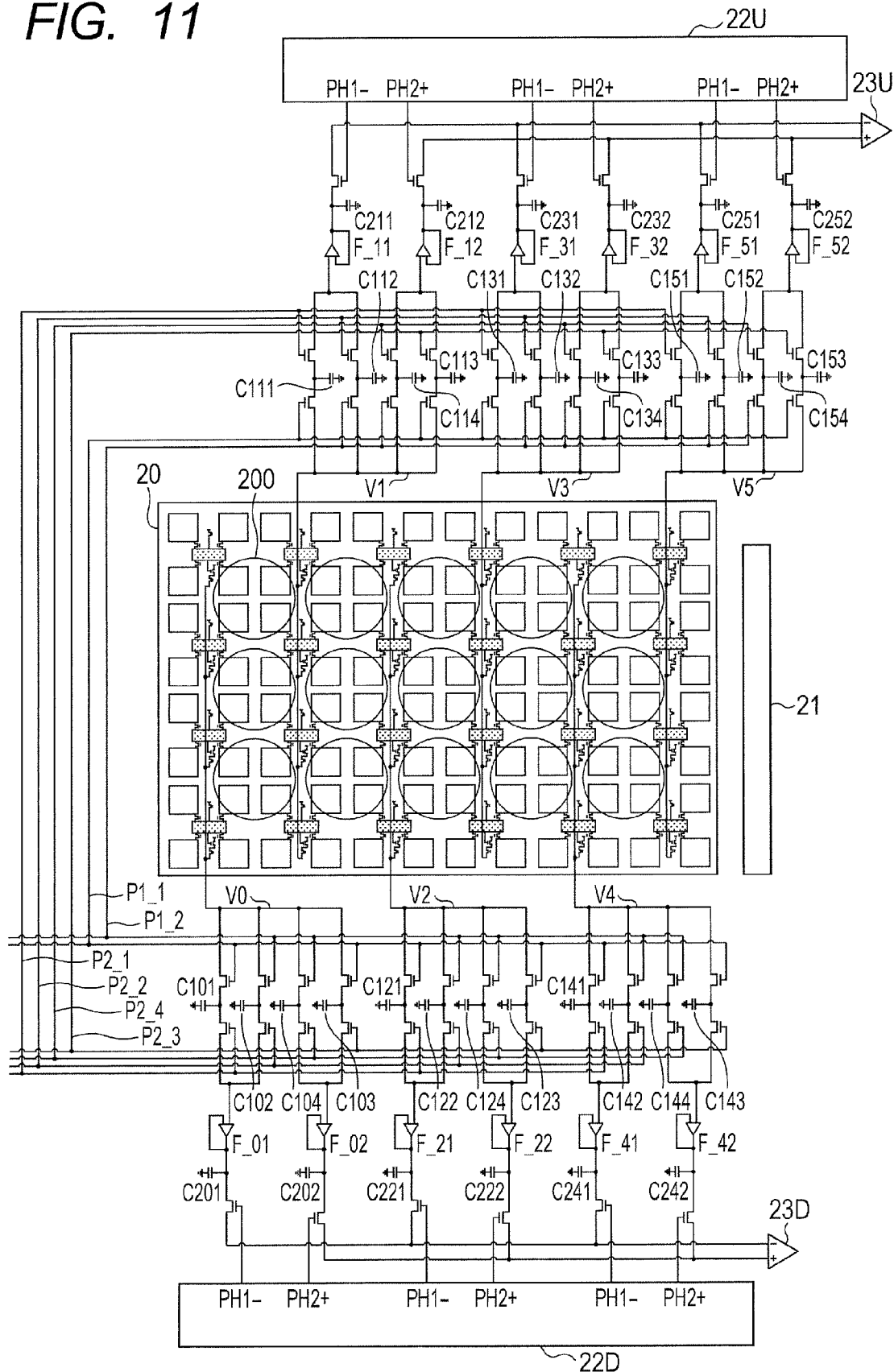
FIG. 11 is a constructional diagram of a solid-state image pickup element according to the fourth embodiment of the invention.

FIG. 11 illustrates a construction of the solid-state image pickup element 2 according to the present embodiment. In the diagram, substantially the same portions as those in the constructions in FIGS. 2, 7, and 9 are designated by the same reference numerals and their description is omitted unless otherwise necessary in particular.

The construction of FIG. 11 differs from that in FIG. 9 with respect to the following points except that the four capacitors of the first signal storage unit are provided for one vertical output line.

First, C1m1 and C1m2 among the four capacitors are selectably connected to the capacitor C2m1 of the second signal storage unit connected to the negative side input terminal of the differential circuit 23U or 23D. Subsequently, C1m4 and C1m3 among the four capacitors are selectably connected to the capacitor C2m2 of the second signal storage unit connected to the positive side input terminal of the differential circuit 23U or 23D. Further, the control line of the transistor for signal transfer from the vertical output line Vm to the capacitors C1m1 and C1m3 is provided as P1_1 in common, and the control line of the transistor for signal transfer to the capacitors C1m2 and C1m4 is provided as P1_2 in common.

Since the sign change is performed in the transferring step, the horizontal scanning signal control lines are simplified only to PH2+ and PH1− in a manner similar to the third embodiment. Correspondingly to that there is no need to perform the sign inversion at the time of the signal transfer from the first signal storage unit to the second signal storage unit, the capacitors associated with the operational amplifiers F_m1 and F_m2 and the transistors for operation control are deleted. Further, the control lines of the transistors for signal transfer to the first signal storage unit are only two control lines P1_1 and P1_2 in accordance with that they are combined to two sets as mentioned above.

Figure 12:
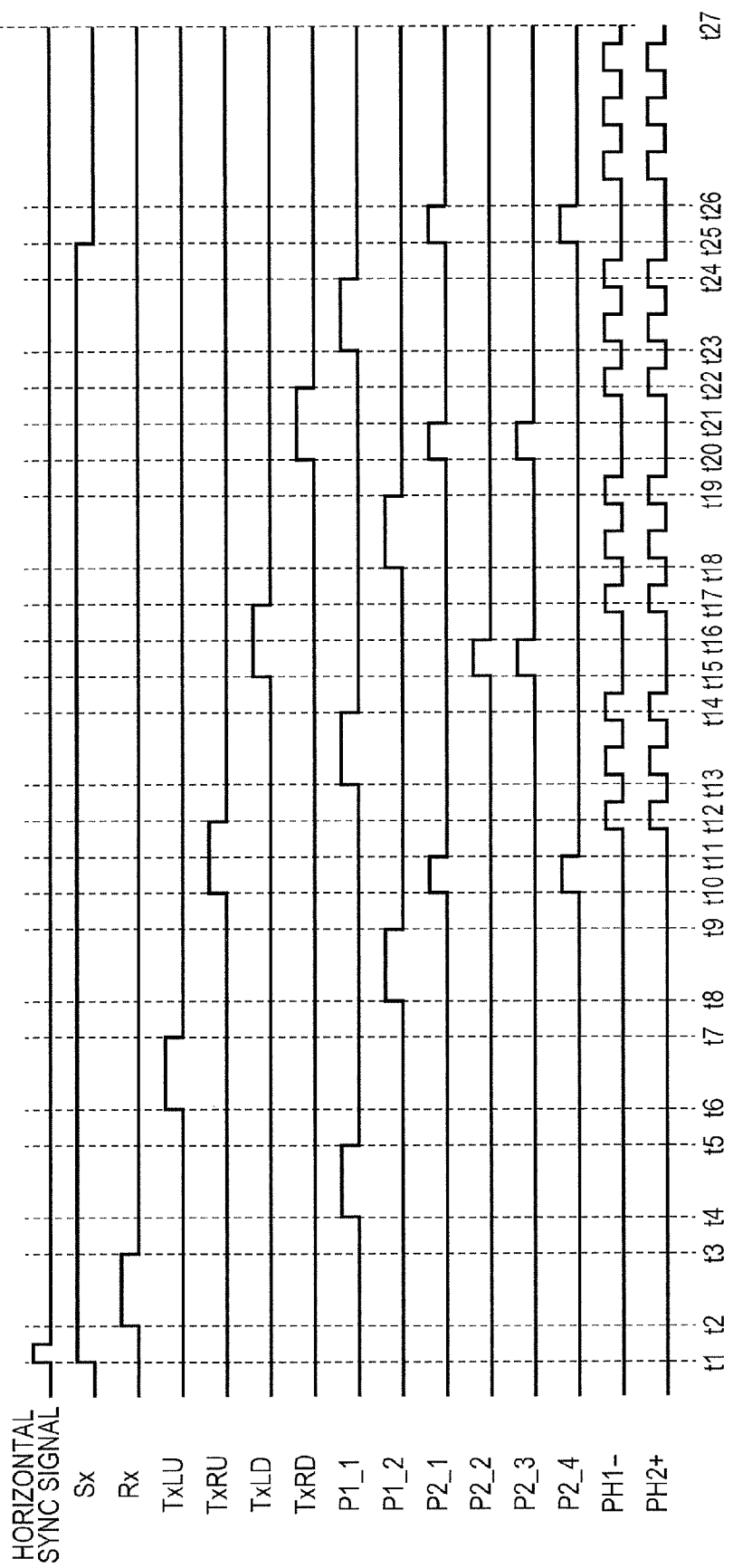
FIG. 12 is a diagram illustrating a timing chart for describing a driving method of the solid-state image pickup element according to the fourth embodiment of the invention.

FIG. 12 illustrates an example of a timing chart for driving the solid-state image pickup element 2 of FIG. 11. It is assumed that among notation regarding time t which are used in the following description, the same notation as that illustrated in FIG. 4 indicates the same time.

FIG. 12 differs from the timing chart of FIG. 10 with respect to a point that the control lines P1_1 and P1_2 of the transistors for signal transfer are alternately set to the high state with the elapse of time. They are set to the high state in the signal transfer periods (from t4 to t5, from t8 to t9, from t13 to t14, from t18 to t19, and from t23 to t24) in the first horizontal blanking period including a period for transferring the reset potential to the first signal storage unit as the signal. In association with the deletion of the transistors for operation control of the operational amplifiers, their control lines PC1 and PC2 are also deleted.

The operation will be described hereinbelow by limiting to the periods shown in the parenthesis.

First, in a period from time t4 to t5, the control line P1_1 is set into the high state so as to transfer the signal corresponding to the reset potential to the capacitors C1m1 and C1m3 of the first signal storage unit. In a period from time t8 to t9, the control line P1_2 is set into the high state so as to transfer the signal provided by adding the potential corresponding to the signal electric charge of the photoelectric conversion element 201LU(n,m) to the reset potential to the capacitors C1m2 and C1m4 of the first signal storage unit.

The signal corresponding to the signal electric charge of the same photoelectric conversion element is transferred to the capacitors C1m2 and C1m4. However, the signal is transferred from the capacitor C1m2 to the capacitor C2m1 of the second signal storage unit for a period from time t10 to t11 and the signal is transferred from the capacitor C1m4 to the capacitor C2m2 of the second signal storage unit in a period from time t15 to t16, respectively. Therefore, the positive/negative sign of the input to the differential circuit 23U or 23D in each period is inverted.

The same signal is transferred and held into the two capacitors of the first signal storage unit in accordance with the sign which is required for such a second horizontal blanking period and the horizontal transfer periods of the first and second times subsequent thereto.

Between the signals in which such two kinds of signs are scheduled, the signal transferred to the capacitor C1m4 corresponding to the positive sign is transferred to the capacitor C1m2 of the second signal storage unit because the control line P2_4 is set into the high state in the second horizontal blanking period of the first time from time t10 to t11. At this time, the control line P2_1 is also set into the high state and the signal transferred to the capacitor C1m1 is transferred to the capacitor C2m1.

On the other hand, the signal transferred to the capacitor C1m2 corresponding to the negative sign is transferred to the capacitor C2m1 of the second signal storage unit in correspondence to another added signal because the control line P2_2 is set into the high state for the next second horizontal blanking period from time t15 to t16.

In a manner similar to that mentioned above, in a period from time t13 to t14, the control line P1_1 is set into the high state so as to transfer another added signal for the next second horizontal blanking period to the capacitors C1m3 and C1m1 to which the signal corresponding to the reset potential is already transferred. Such another added signal is a signal provided by adding the potential corresponding to the signal electric charge to which the signal electric charge of each of the photoelectric conversion elements 201LU(n,m) and 201RU(n,m) is added, to the reset potential.

In a manner similar to that mentioned above, in a period from time t18 to t19, the control line P1_2 is set into the high state so as to transfer another added signal for the further next second horizontal blanking period to the capacitors C1m2 and C1m4 of the first signal storage unit. Such another added signal is a signal provided by adding the potential corresponding to the signal electric charge to which the signal electric charge of each of the photoelectric conversion elements 201LU(n,m), 201RU(n,m), and 201LD(n,m) is added, to the reset potential.

The added signal which is transferred to the capacitors C1m1 and C1m3 of the first signal storage unit in a period from time t23 to t24 is not used as a signal for the negative sign. The added signal in this case is a signal provided by adding the potential corresponding to the signal electric charge to which the signal electric charge of each of the photoelectric conversion elements 201LU(n,m), 201RU(n,m), 201LD(n,m), and 201RD(n,m) is added, to the reset potential. The signal corresponding to the reset potential cannot be used either as a signal for the positive sign. However, since there is a large advantage in which the control lines of the transistor for transfer to the first signal storage unit can be made common without a trouble in particular, they are not individually controlled.

According to the construction of the fourth embodiment mentioned above, in combination with the driving method whereby the same signal corresponding to the positive/negative sign is prepared in the transfer to the capacitors of the signal storage unit, the advantages peculiar to the present invention can be obtained.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-199711, filed on Sep. 13, 2011, which is hereby incorporated by reference herein in its entirety.

What is claimed is:

1. A solid-state image pickup element comprising:
a pixel area in which unit cells each having a plurality of photoelectric conversion elements and a signal read-out unit of a signal electric charge provided in common for the photoelectric conversion elements, are arranged two-dimensionally in rows and columns;
a plurality of vertical output lines which are connected in common to the unit cells of each column of the two-dimensional arrangement and transfer, on the column basis, signals of the unit cells, which are read out by the signal read-out unit;
a selection unit configured to select the plurality of unit cells on the row basis of the two-dimensional arrangement;
a plurality of first signal storage units, at least a first predetermined number of which are connected to each vertical output line to store the signal transferred from the unit cell selected by the selection unit to each of the vertical output lines;
a plurality of second signal storage units, at least a second predetermined number of which are connected to each vertical output line to store the signals transferred from the first number of first signal storage units;
a horizontal transfer unit configured to transfer the signals transferred from the plurality of second signal storage units, in the row direction on the column basis; and
a plurality of control line units configured to control a driving of the signal read-out unit, the plurality of first signal storage units, and the plurality of second signal storage units of each of the unit cells,
wherein the plurality of control line units selectively drive the plurality of first signal storage units and the plurality of second signal storage units such that in a period of time for selectively driving the first signal storage unit to store the signal transferred from the unit cell to the vertical output line by the signal read-out unit of the selected unit cell, another first signal storage unit connected to the vertical output line and the second signal storage unit to store the signal transferred from the another first signal storage unit are selectively driven.

2. An element according to claim 1, wherein
each of the first and second predetermined numbers is equal to 3 and the number of plurality of photoelectric conversion elements included in the unit cell is equal to at least 3,
the signal read-out unit has a function of reading out an added signal in which the signals from at least two of the plurality of photoelectric conversion elements are added, to the vertical output line,
the control line units selectively drive one of the first predetermined number of first signal storage units connected to the vertical output line in order to store the added signal and at that time, selectively drive the second signal storage unit corresponding to the another first signal storage unit in order to store the signal stored in the other first signal storage unit, and
the horizontal transfer unit selectively connects the corresponding second signal storage unit to different horizontal output lines in accordance with the signal stored in the another first signal storage unit.

3. An element according to claim 1, wherein
the first and second predetermined numbers are respectively equal to 3 and 2 and the number of plurality of photoelectric conversion elements included in the unit cell is equal to at least 3, the signal read-out unit has a function for reading out an added signal in which the signals from at least two of the plurality of photoelectric conversion elements are added, to the vertical output line, the control line units selectively drive one of the three first signal storage units connected to the vertical output line in order to store the added signal and at that time, selectively drive the two second signal storage units in order to store the signal stored in the another first signal storage unit, and the horizontal transfer unit selectively connects the two second signal storage units to different horizontal output lines in accordance with the signal stored in the another first signal storage unit.

4. An element according to claim 1, wherein the first and second predetermined numbers are respectively equal to 3 and 2 and the number of plurality of photoelectric conversion elements included in the unit cell is equal to at least 3, the signal read-out unit has a function for reading out an added signal in which the signals from at least two of the plurality of photoelectric conversion elements are added, to the vertical output line, the control line units selectively drive one of the three first signal storage units connected to the vertical output line in order to store the added signal and at that time, selectively drive the two second signal storage units in order to store the signal stored in the another first signal storage unit, the solid-state image pickup element further includes a plurality of potential inversion units configured to invert the potential of each signal transferred from the another first signal storage unit to the two second signal storage units in accordance with the signal stored in the another first signal storage unit, and the horizontal transfer unit fixedly connects the two second signal storage units to different horizontal output lines.

5. An element according to claim 1, wherein the first and second predetermined numbers are respectively equal to 4 and 2 and the number of plurality of photoelectric conversion elements included in the unit cell is equal to at least 3, the signal read-out unit has a function for reading out an added signal in which the signals from at least two of the plurality of photoelectric conversion elements are added, to the vertical output line, the control line units selectively drive two of the four first signal storage units connected to the vertical output line in order to store the added signal and at that time, selectively drive the two second signal storage units in order to store the signal stored in the another first signal storage unit, and the horizontal transfer unit fixedly connects the two second signal storage units to different horizontal output lines.

6. An element according to claim 1, wherein the different horizontal output lines are connected to different input terminals of an operational amplifier, respectively.

7. An element according to claim 1, wherein the unit cell includes a resetting unit configured to reset the signal read-out unit, an electric charge read-out unit configured to read out the electric charge from each of the photoelectric conversion elements included in the unit cell, and a transfer unit configured to transfer a reset potential of the signal read-out unit or a potential corresponding to the electric charge read out by the electric charge read-out unit to the vertical output line as a signal, and the signal read-out unit reads out a potential provided by sequentially adding the potential corresponding to the electric charge read out from each photoelectric conversion element to the reset potential, to the vertical output line as an added signal through the transfer unit.

8. A control method of a solid-state image pickup element having a pixel area in which unit cells each having a plurality of photoelectric conversion elements and a signal read-out unit of a signal electric charge provided in common for the photoelectric conversion elements, are arranged two-dimensionally in rows and columns, a plurality of vertical output lines which are connected in common to the unit cells of each column of the two-dimensional arrangement and transfer, on the column basis, signals of the unit cells which are read out by the signal read-out unit, and a selection unit configured to select the plurality of unit cells on the row basis of the two-dimensional arrangement, comprising:

storing the signal transferred from the unit cell selected by the selection unit to each of the vertical output lines into a plurality of first signal storage units, at least a first predetermined number of which are connected to each vertical output line;

storing the signals transferred from the first number of first signal storage units into a plurality of second signal storage units, at least a second predetermined number of which are connected to each vertical output line; and transferring the signals transferred from the plurality of second signal storage units to a horizontal transfer unit, in the row direction on the column basis, wherein the plurality of first signal storage units and the plurality of second signal storage units are selectively driven through a plurality of control line units configured to drive the signal read-out unit, the plurality of first signal storage units, and the plurality of second signal storage units of each of the unit cells, such that in a period of time for selectively driving the first signal storage unit to store the signal transferred from the unit cell to the vertical output line by driving the signal read-out unit of the selected unit cell, another first signal storage unit connected to the vertical output line and the second signal storage unit to store the signal transferred from the another first signal storage unit are selectively driven.

9. A non-transitory computer-readable recording medium recording a program for causing a computer to function in a control method of a solid-state image pickup element comprising a pixel area in which unit cells each having a plurality of photoelectric conversion elements and a signal read-out unit of a signal electric charge provided in common for the photoelectric conversion elements, are arranged two-dimensionally in rows and columns, a plurality of vertical output lines which are connected in common to the unit cells of each column of the two-dimensional arrangement and transfer, on the column basis, signals of the unit cells which are read out by the signal read-out unit, and a selection unit configured to select the plurality of unit cells on the row basis of the two-dimensional arrangement, as:

a plurality of first signal storage units, at least a first predetermined number of which are connected to each vertical output line to store the signal transferred from the unit cell selected by the selection unit to each of the vertical output lines;

a plurality of second signal storage units, at least a second predetermined number of which are connected to each vertical output line to store the signals transferred from the first number of first signal storage units;

a horizontal transfer unit configured to transfer the signals transferred from the plurality of second signal storage units in the row direction on the column basis; and a plurality of control line units which are provided to drive the signal read-out unit, the plurality of first signal storage units, and the plurality of second signal storage units of each of the unit cells and configured to selectively drive the plurality of first signal storage units and the plurality of second signal storage units, such that in a period of time for selectively driving the first signal storage unit to store the signal transferred from the unit cell to the vertical output line by driving the signal read-out unit of the selected unit cell, another first signal storage unit connected to the vertical output line and the second signal storage unit to store the signal transferred from the another first signal storage unit is selectively driven.

10. An image pickup apparatus comprising:
the solid-state image pickup element according to claim 1;
a signal processing unit configured to execute a signal processing to an image signal which is output from the solid-state image pickup element; and
a control unit configured to supply a control signal to the control line units of the solid-state image pickup element.

11. A non-transitory computer-readable recording medium recording a program for causing a computer to function in a control method of an image pickup apparatus comprising the solid-state image pickup element according to claim 1 and a signal processing unit configured to execute a signal processing to an image signal which is output from the solid-state image pickup element, as a control unit configured to supply a control signal to the control line units of the solid-state image pickup element.

* * * * *